(12) United States Patent
Sasaki et al.

(10) Patent No.: US 7,440,656 B2
(45) Date of Patent: Oct. 21, 2008

(54) OPTICAL PULSE TIME SPREADER

(75) Inventors: Kensuke Sasaki, Kanagawa (JP); Shuko Kobayashi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/783,676

(22) Filed: Apr. 11, 2007

(65) Prior Publication Data

US 2007/0248303 A1 Oct. 25, 2007

(30) Foreign Application Priority Data

Apr. 20, 2006 (JP) .............................. 2006-116538

(51) Int. Cl.
*G02B 6/34* (2006.01)
(52) U.S. Cl. .......................................... 385/37; 385/14
(58) Field of Classification Search ................... 385/37, 385/14
See application file for complete search history.

(56) References Cited

U.S. PATENT DOCUMENTS 6,389,045 B1 * 5/2002 Mann et al. ................. 372/25
2006/0269286 A1* 11/2006 Sasaki ......................... 398/77
2007/0223927 A1* 9/2007 Sasaki et al. ................ 398/98

OTHER PUBLICATIONS

"Optical fiber diffraction grating", Toru Mizumani, Applied Physics, vol. 67, No. 9, pp. 1029-1034 (1998), Only Figures/ No Translation.

"Development of Encoder/Decoder for OCDM using SSFBG", Akihiro Nishiki et al., Technical Report of IEICE, OFT 2002-66, (Nov. 2002), Only Figures/No Translation.
"Optical code division multiplexing network", Hideyuki Sotobayashi, Applied Physics, vol. 71, No. 7, pp. 853-859 (2002), Only Figures/No Translation.
"Experimental Demonstration of Performance Improvement of 127-Chip SSFBG En/Decoder Using Apodization Technique", Koji Matsushima et al., IEEE Photonics Technology Letters, vol. 16, No. 9, pp. 2192-2194, Sep. 2004.

* cited by examiner

*Primary Examiner*—Frank G Font
*Assistant Examiner*—Eric Wong
(74) *Attorney, Agent, or Firm*—Venable LLP; James R. Burdett

(57) ABSTRACT

An optical pulse time spreader which can generate a chip pulse string of which intensity is equalized. The reflectances $R_1$, $R_2$ and $R_k$ of the first, second and k-th (k is an integer which satisfies $3 \leq k \leq J$) unit FBG are given by the following formulae respectively.

$$R_1 = P_c (\text{constant}) \quad (a)$$

$$R_2 = P_c/(1-R_1)^2 \quad (b)$$

$$R_k = (P_c^{1/2} - P_k^{1/2})^2 / \{(1-R_1)^2 \cdot (1-R_2)^2 \ldots (1-R_{k-1})^2\} \quad (c\text{-}1)$$

$$R_k = (P_c^{1/2} + P_k^{1/2})^2 / \{(1-R_1)^2 \cdot (1-R_2)^2 \ldots (1-R_{k-1})^2\} \quad (c\text{-}2)$$

Here $P_c$ is an arbitrary constant, and $P_k$ is an intensity of a triple reflection chip pulse which is output for the k-th time. The formulae (c-1) and (c-2) are the reflectance of the k-th unit diffraction grating when the phase difference between the single reflection chip pulse, which is output for the k-th time, and the triple reflection chip pulse, which is output for the k-th time, is 0 and π respectively.

12 Claims, 15 Drawing Sheets

Input Optical Pulse

Encoded Optical Pulse String

Encoded Optical Pulse String

⇓ Superimposing

Auto-Correlation Waveform

Positional Coordinate of Optical Fiber in Length Direction

Enlarge

Positional Coordinate of Optical Fiber in Length Direction $$\exp\left[-\ln 2\left\{\frac{2(x-\frac{L}{2})}{LB}\right\}^2\right] \qquad \frac{\Delta n}{2}\sin\left(\frac{2\pi x}{\Lambda}\right)$$

OPTICAL PULSE TIME SPREADER

BACKGROUND OF THE INVENTION

1. Field of the Invention

The present invention relates to an optical pulse time spreader which is used as an encoder or decoder in an optical code division multiplexing (OCDM) communication system, and more particularly, to an optical pulse time spreader where unit diffraction gratings are arrayed in series along the wave guiding direction of an optical wave guide.

2. Description of Related Art

Today demands for communication is rapidly increasing due to the spread of the Internet and other reasons. To support this, high-speed and large capacity networks using optical fibers are being provided. And to increase the capacity of communication, optical multiplexing technology for transmitting a plurality of channels of optical pulse signals simultaneously using one optical fiber transmission line is under consideration.

As one optical multiplexing technology, OCDM is under research. A feature of OCDM is flexibility in operation, that is, no restrictions in the number of optical pulse signals assigned per bit on the time base. Another feature is that a plurality of channels can be set for a same time slot on a time base, or that a plurality of communication channels can be set for a same wavelength on a wavelength base.

OCDM is a communication method for assigning a different code (pattern) to each channel and extracting signals by pattern matching. In other words, OCDM is an optical multiplexing technology for encoding the optical pulse signal by an optical code which is different for each communication channel at the transmission side, and for decoding the encoded optical pulse signal using a same optical code as the transmission side so as to return it to the original optical pulse signal at the receive side.

Since only the optical pulse signal of which code matches is extracted and processed as an effective signal during decoding, the optical pulse signal comprised of lights with a same wavelength, or with a plurality of wavelengths combined, can be assigned to a plurality of communication channels. For the encoder, a passive optical element, such as a Fiber-Bragg-Grating (FBG) can be used for the phase control required for code processing, so the communication rate can be faster without receiving electric limitation in code processing. Also a plurality of channels can be multiplexed with a same wavelength at a same point in time, and large capacity data can be communicated.

As a means of encoding in OCDM, an optical phase encoding method, which uses a phase of light as a code, is known. Specifically, a superstructure Fiber-Bragg-Grating (SSFBG) is used for the encoder and decoder (e.g. see Toru Mizunami: "Optical fiber diffraction grating", Applied Physics, Vol. 67, No. 9, pp. 1029-1034 (1998), or Akihiko Nishiki, Hideyuki Iwamura, Shuko Kobayashi, Satoko Kutsuzawa, and Saeko Oshiba: "Development of Encodr/Decoder for OCDM using a SSFBG", Technical Report of IEICE, OFT 2002-66, (2002-11), or Hideyuki Sotobayashi: "Optical code division multiplexing network", Applied Physics, Vol. 71, No. 7, pp. 853-859 (2002)).

Now the operation principle of the case when the optical pulse time spreader, which uses SSFBG as the phase control means, is used as an encoder and decoder will be described with reference to FIGS. 1A to 1E. Hereafter the optical pulse time spreader which uses SSFBG as a phase control means may simply be called a "SSFBG optical pulse time spreader". FIG. 1A is a diagram depicting the time-based waveform of an input optical pulse. FIG. 1E is a diagram for explaining the state when an encoded optical pulse string encoded by an encoder is decoded by a decoder.

The input optical pulse shown in FIG. 1A is input to an encoder 10 from an optical fiber 12 via an optical circulator 14 as shown in FIG. 1E, and is encoded there, then propagates an optical fiber 18 via the optical circulator 14 again, and is input to a decoder 20 via an optical circulator 22. And auto-correlation waveforms are generated by the optical pulse being decoded by the decoder 20, and this auto-correlation waveform propagates an optical fiber 26 via the optical circulator 22.

The encoder 10 and decoder 20 shown in FIG. 1E are SSFBGs comprised of 4 unit FBGs being arrayed along the wave guiding direction of the optical fiber. Here the functions of the encoder 10 and decoder 20 will be described using 4-bit optical code (0, 0, 1, 0) as an example. The number of terms of the sequence formed by "0s" and "1s" which provide the optical code may be called a "code length". In this example the code length is 4. The sequence to provide an optical code may be called a "code string", and each term "0" and "1" of the code string may be called a "chip". And the value of 0 or 1 itself may be called a "code value".

The unit FBG 10a, 10b, 10c and 10d, constituting the encoder 10, corresponds to the first chip "0", second chip "0", third chip "1" and fourth chip "0" of the optical code respectively. Whether the code value is 0 or 1 is determined by the phase relationship of the Bragg-reflected light, which is reflected from the adjacent unit FBG. In other words, the first chip and second chip have the same code value 0, so the phase of the Bragg-reflected light reflected from the unit FBG 10a which corresponds to the first chip, and the phase of the Bragg-reflected light reflected from the unit FBG 10b which corresponds to the second chip are the same. The code value of the second chip is 0 and the code value of the third chip is 1, so these chips have different values. Therefore the difference between the phase of the Bragg-reflected light reflected from the unit FBG 10b which corresponds to the second chip and the phase of the Brigg-reflected light reflected from the unit FBG 10c which corresponds to the third chip is $\pi$. In the same way, the code value of the third chip is 1 and the code value of the fourth chip is 0, so these chips have different values. Therefore the difference between the phase of the Bragg-reflected light reflected from the unit FBG 10c which corresponds to the third chip and the phase of the Brigg reflected light reflected from the unit FBG 10d which corresponds to the fourth chip is $\pi$.

This optical code defined by changing the phase of the Bragg-reflected light from the unit FBG may be called an "optical phase code".

Now the steps of the formation of the auto-correlation waveform by the optical pulses being encoded by the encoder and converted into an encoded optical pulse string and the encoded optical pulse string being decoded by the decoder will be described. When a single optical pulse shown in FIG. 1A is input from the optical fiber 12 to the encoder 10 via the optical circulator 14 and the optical fiber 16, the Bragg-reflected lights from the unit FBGs 10a, 10b, 10c and 10d are generated. These Bragg-reflected lights from the unit FBGs 10a, 10b, 10c and 10d are assumed to be a, b, c and d respectively. In other words, the single optical pulse shown in FIG. 1A is time-spread to Bragg-reflected lights a, b, c and d, and converted into an encoded optical pulse string.

The Bragg-reflected lights a, b, c and d are separated into 4 optical pulses, and constitute an optical pulse string where the optical pulses are arrayed with a specific interval which depends on the way of arraying the unit FBGs 10a, 10b, 10c and 10d on the time base, as shown in FIG. 1B. Therefore the encoded optical pulse string is an optical pulse string, which is the optical pulse input to the encoder time-spread into a plurality of optical pulses on the time base.

FIG. 1B shows the encoded optical pulse string propagating the optical fiber 18 with respect to the time base. In FIG. 1B, the optical pulses are shifted in the ordinate direction so as to clearly show the encoded optical pulse string.

The Bragg-reflected light by the unit FBG 10a is the optical pulse indicated by a in FIG. 1B. In the same way, the Bragg-reflected lights by FBG 10b, FGB 10c and FGB 10d are optical pulses indicated by b, c and d respectively in FIG. 1B. The optical pulse indicated by a is an optical pulse reflected from the unit FBG 10a, which is closest to the input end of the encoder 10, so this pulse is at a position most advanced on the time base. The optical pulses indicated by b, c and d are Bragg-reflected lights from FBG 10b, FBG 10c and FBG 10d, and FBG 10b, FBG 10c and FBG 10d are arrayed in this sequence from the input end of the encoder 10, so the optical pulses indicated by b, c and d are arrayed in the sequence of b, c and d after the optical pulse indicated by a, as shown in FIG. 1B. In the following description, the optical pulses corresponding to the Bragg-reflected light a, Bragg-reflected light b, Bragg-reflected light c and Bragg-reflected light d may be called the "optical pulse a, optical pulse b, optical pulse c and optical pulse d" respectively. The optical pulse a, optical pulse b, optical pulse c and optical pulse d may be called the "chip pulses".

The phase relationship of the Bragg-reflected lights a, b, c and d, constituting the encoded optical pulse string which was described above, are as follows. The phases of the Bragg-reflected light a and the phase of the Bragg-reflected light b are the same. The difference of the phase of the Bragg-reflected light b and the phase of the Bragg-reflected light c is $\pi$. The difference of the phase of the Bragg-reflected light c and the phase of the Bragg-reflected light d is $\pi$. In other words, if the phase of the Bragg-reflected light a is used as a reference, the phases of the Bragg-reflected light a, Bragg-reflected light b and Bragg-reflected light d are the same, and the phase of the Bragg-reflected light c is different from those by $\pi$.

In FIG. 1B, the optical pulses corresponding to the Bragg-reflected light a, Bragg-reflected light b and Bragg-reflected light d are shown by a solid line, and the optical pulse corresponding to the Bragg-reflected light c is shown by a broken line. In other words, the sold line and the broken line are used to indicate the corresponding optical pulses in order to distinguish the phase relationships of the Bragg-reflected lights. The phases of the optical pulses indicated by the sold line are the same, and the phases of the optical pulses indicated by the broken line are the same. And the phase of the optical pulses indicated by the solid line and the phase of the optical pulse indicated by the broken line are different from each other by $\pi$.

The encoded optical pulse string propagates the optical fiber 18 and is input to the decoder 20 via the optical circulator 22. The decoder 20 has the same structure as the encoder 10, but the input end and output end are reversed. In other words, the unit FBGs 20a, 20b, 20c and 20d are arrayed sequentially from the input end in the decoder 20, and the unit FBG 20a corresponds to the unit FBG 10d. In the same way, the unit FBG 20b, unit FBG 20c and unit FBG 20d correspond to the unit FBG 10c, unit FBG 10b and unit FBG 10a respectively.

For the encoded optical pulse string to be input to the decoder 20, the optical pulse a constituting this encoded optical pulse string are first Bragg-reflected from the unit FBGs 20a, 20b, 20c and 20d respectively. This state will be described with reference to FIG. 1C. In FIG. 1C, the abscissa is the time base. And 1 to 7 are assigned for convenience to indicate the sequence in time.

FIG. 1C is a diagram depicting the encoded optical pulse string with respect to the time base, just like FIG. 1B. The encoded optical pulse string which is input to the decoder 20 is Bragg-reflected by the unit FBG 20a. The reflected light which was Bragg-reflected by the unit FBG 20a is called "Bragg-reflected light a'". In the same way, the reflected lights, which were Bragg-reflected by the unit FBG 20b, unit FBG 20c and unit FBG 20d are called "Bragg-reflected lights b', c' and d'" respectively.

From the unit FBG 20a, the optical pulses a, b, c and d, constituting the encoded optical pulse string, are Bragg-reflected and arrayed in the string a' on the time base in FIG. 1C. The optical pulse a, Bragg-reflected by the unit FBG 20a, is an optical pulse of which peak is at the position indicated by 1 on the time base. The optical pulse b, Bragg-reflected by the unit FBG 20a, is an optical pulse of which peak is at the position indicated by 2 on the time base. And in the same way, the optical pulse c and optical pulse d are optical pulses of which peaks are at the positions indicated by 3 and 4 on the time base respectively.

From the unit FBG 20b as well, the optical pulses a, b, c and d constituting the encoded optical pulse string are Bragg-reflected, and arrayed in the string b' on the time base in FIG. 1C. Compared with the Bragg-reflected lights a', c' and d', the phase of the Bragg-reflected light b', which is reflected from the unit FBG 20b, is shifted by $\pi$. Therefore the phases of the optical pulse string arrayed on the string a' on the time base and the phases of the optical pulse string arrayed on the string b' on the time base are all shifted by $\pi$.

Therefore the optical pulses arrayed in the sequence of 1 to 4 in the string a' on the time base are arrayed in the sequence of solid line, solid line, broken line and solid line, but the optical pulses arrayed in the sequence of 2 to 5 in the string b' on the time base are arrayed in the sequence of broken line, broken line, solid line and broken line. The optical pulse string a' and optical pulse string b' are shifted on the time base, because among the optical pulses constituting an encoded optical pulse string, the optical pulse a is input to the decoder 20 before the optical pulse b.

In the same way, from the unit FBG 20c and unit FBG 20d, the optical pulses a, b, c and d constituting the encoded optical pulse string are Bragg-reflected, and arrayed in the strings c' and d' on the time base in FIG. 1C respectively. The phases of the Bragg-reflected lights c' and d' which are reflected from the unit FBG 20c and the unit FBG 20d are the same as the Bragg-reflected light a'. Therefore the optical pulse string c' and the optical pulse string d' are arrayed on the time base in FIG. 1C. The optical pulses related to the Bragg-reflected lights a', c' and d' are shifted in parallel on the time base, but the mutual phase relationship of the respective optical pulses related to the Bragg-reflected lights are the same.

FIG. 1D shows an auto-correlation waveform of the input optical pulse decoded by the decoder 20. The abscissa is a time base, which corresponds to the diagram in FIG. 1C. The auto-correlation waveform is given by the sum of the Bragg-reflected lights a', b', c' and d' from each unit FBG of the encoder, so it is all the Bragg-reflected lights a', b', c' and d' shown in FIG. 1C combined. At the time indicated by 4 on the time base in FIG. 1C, all the optical pulses related to the Bragg-reflected lights a', b', c' and d' are added at the same phase, so the maximum peak is formed. At the time indicated by 3 and 5 on the time base in FIG. 1C, two optical pulses indicated by the broken line and one optical pulse indicated by the solid line area added, so a peak the same as one optical pulse, of which phase is different from the maximum peak, which is located at the time indicated by 4, by π is formed. At the time indicated by 1 and 7 on the time base in FIG. 1C, there is one optical pulse indicated by the solid line, so a peak the same as one optical pulse of which phase is the same as the maximum peak, which is located at the time indicated by 4, is formed.

As described above, the optical pulse is encoded by then encoder 10, and becomes the encoded optical pulse string, chip pulse) generated by being Bragg-reflected by the unit FBG (former unit FBG) and the chip pulse (latter chip pulse) which is output adjacent to this chip pulse are chip pulses generated by being Brigg-reflected by the unit FBG (latter unit FBG) which is arranged next to this unit FBG (former unit FBG). Therefore the latter chip pulse is output later by the time for the pulse to travel back and forth once $((\pi/2) \times 2 = \pi)$ in the interval between the former unit FBG and the latter unit FBG $(\pi/2)$.

TABLE 1

| Code | 0 | 0 | 0 | 1 | 1 | 1 | 1 | 0 | 1 | 0 | 1 | 1 | 0 | 0 | 1 |
|---|---|---|---|---|---|---|---|---|---|---|---|---|---|---|---|
| Phase Shift Amount | 0 | 0 | $\frac{\pi}{2}$ | 0 | 0 | 0 | $\frac{\pi}{2}$ | $\frac{\pi}{2}$ | $\frac{\pi}{2}$ | $\frac{\pi}{2}$ | 0 | $\frac{\pi}{2}$ | 0 | 0 | $\frac{\pi}{2}$ | and this encoded optical pulse string is decoded by the decoder 20, and an auto-correlation waveform is generated. In the above example, 4-bits (code lengths 4) of optical code (0, 0, 1, 0,) was used, but the above description is still valid even if the optical code is different from this.

Now the general structure of SSFBG, which is the phase control means of a conventional optical pulse time spreader, will be described with reference to FIGS. 2A to 2C. FIG. 2A is a cross-sectional view depicting an SSFBG. This SSFBG has an SSFBG 30 installed at the core 34 of an optical fiber 36, which is comprised of the core 34 and the clad 32. The SSFBG 30 is comprised of 15 unit FBGs arrayed in series along the wave guiding direction of the core 34, which is an optical wave guide of the optical fiber 36.

The optical phase code which is set in the conventional SSFBG in FIG. 2A is (0, 0, 0, 1, 1, 1, 1, 0, 1, 0, 1, 1, 0, 0, 1) in 15-bit code string notation. And the correspondence of the 15 unit FBGs arrayed in series in the core 34 and the above optical codes are as follows. The unit FBGs arrayed in the direction from the left end to the right end of the SSFBG 30 in FIG. 2A and the chips arrayed in the direction from the left end to the right end of (0, 0, 0, 1, 1, 1, 1, 0, 1, 0, 1, 1, 0, 0, 1), which indicate the optical codes of the unit FBG denoted as a 15-bit code string, correspond one-to-one.

The refractive index modulation period Λ of the 15 unit FBGs and the Bragg reflection wavelength λ have the relationship $\lambda = 2n_{eff} \Lambda$. Here $n_{eff}$ is an effective refractive index with respect to the light guided through the core 34. In the following description, the effective refractive index may be simply called the "refractive index". In other words, the refractive index modulation structure of SSFBG 30 in FIG. 2B, which will be described later, refers to the modulation structure of the refractive index of the SSFBG 30.

In FIG. 2A, there are 2 cases of the phase relationship of the Bragg-reflected light, which is reflected from the adjacent unit FBG, that is the case of having phase difference 0, and the case of having phase difference π. In FIG. 2A, if a number from 1 to 15 is sequentially assigned to the unit FBGs arrayed from the left to right, so as to be unit FBG 1, unit FBG 2, ..., unit FBG 15, the phase relationship of the Bragg-reflected light, which is reflected from the adjacent unit FBG, can be set as shown in Table 1 in order to set 15-bit code string (0, 0, 0, 1, 1, 1, 1, 0, 1, 0, 1, 1, 0, 0, 1).

The unit FBG for generating an adjacent chip pulse, of which phase difference is π, is an adjacent unit FBG, and the geometric arrangement interval (phase shift amount in Table 1) of these unit FBGs which are adjacent to each other is π/2 if converted into a phase value since light travels back and forth in this interval. In other words, the chip pulse (former Concerning the phase relationship of the Bragg-reflected lights which are reflected from the adjacent unit FBGs, the case when the phase difference between them is 0 and π is the case of 2πM and $(2N+1)\pi (=2\pi N+\pi)$, where M and N are integers. In this case, the interval between the adjacent unit FBGs is given by πM and $\pi N + (\pi/2)$ if they are converted into phase values. In other words, the phase difference of the Bragg-reflected light from the unit FBG, which is reflected from the adjacent unit FBG, is double the interval of these adjacent unit FBGs since light travels between these adjacent unit FBGs back and forth. However, in the following description, the phase value may be denoted simply as 0 and π/2, that is, M=N=0, omitting general notation such as πM and $\pi N + (\pi/2)$.

In FIG. 2A, if the phases of the Bragg-reflected lights between adjacent unit FBGs are different by π, the interval between these unit FBGs is filled in black. If the phases of the Bragg-reflected lights between adjacent unit FBGs are the same, the interval between these unit FBGs is shown as a continuous optical modulation structure. In FIG. 2B, on the other hand, if the phases of the Bragg-reflected lights between adjacent unit FBGs are different by π, the interval between these unit FBGs is indicated by a black upside down triangle.

If the phases of the Bragg-reflected lights between adjacent unit FBGs are the same, the refractive index modulation structure of these unit FBGs has a continuous periodic structure. If the phases of the Bragg-reflected lights between adjacent unit FBGs are different by π, on the other hand, a shift for the amount of π (jump of π phase) is inserted at the boundary of these unit FBGs in the refractive index modulation structure of these FBGs.

Hereafter the numbers 1 to 15 assigned to each unit FBG may be called a "unit FBG number". The unit FBG 1, unit FBG 2, ..., unit FBG 15 may also be called the "first unit FBG, second unit FBG, ..., fifteenth unit FBG".

The top level of Table 1 indicates the 15-bit code string (0, 0, 0, 1, 1, 1, 1, 0, 1, 0, 1, 1, 0, 0, 1), and the unit FBG 1, unit FBG 2, ..., unit FBG 15 correspond to these 15 code values one-to-one. The bottom level of Table 1 shows the phase relationship of the Bragg-s reflected lights reflected from the adjacent unit FBGs. For example, it is shown that the phase difference between the Bragg-reflected lights reflected from the unit FBG 1 and unit FBG 2 is 0, and in the same way, the phase difference between the Bragg-reflected lights reflected from the unit FBG 2 and unit FBG 3 is 0. Also the phase difference of the Bragg-reflected lights reflected from the unit FBG 3 and unit FBG 4 is π. This is the same for the unit FBGs other than the unit FBG 1 to unit FBG 4.

The characteristic of this SSFBG 30 is that the refractive index modulation intensity of the periodic refractive index modulation structure forming the unit FBGs which are arrayed in series along the wave guiding direction of the optical fiber is simply increased along the wave guiding direction of this optical fiber.

FIG. 2B is a diagram depicting the refractive index modulation structure of the SSFBG 30 shown in FIG. 2A. FIG. 2C is an enlarged view of a part of the refractive index modulation structure of the unit FBG shown in FIG. 2B. The level Δn of the refractive index modulation of the refractive index modulation structure of the unit FBG is simply increased along the wave guiding direction (x direction) of the optical fiber 36. In FIG. 2B, the refractive index of the unit FBG at the position where the level of the refractive index modulation is at maximum is $n_a+(\Delta n/2)$, and the refractive index of the unit FBG at the position where the level is minimum is $n_a-(\Delta n/2)$. Here $n_a$ is an average value of the refractive index of the optical fiber 36.

In other words, in FIG. 2B, the central axis, that indicates the average refractive index $n_a$ of the optical fiber, is indicated by a straight line which is parallel with the abscissa indicating the positional coordinate of the optical fiber in the length direction. In other words, the curves above this straight line indicate that the average refractive index is $\Delta n/2$ higher than $n_a$, and the curves below this straight line indicate that the average refractive index is $\Delta n/2$ lower than $n_a$. Therefore the level of the refractive index of the SSFBG 30 is expressed as $n_a \pm (\Delta n/2)$ using the average refractive index $n_a$.

The relationship between the reflectance of each unit FBG and the intensity of the output chip pulse from each unit FBG will be described with reference to FIGS. 3A and 3B. In FIGS. 3A and 3B, the abscissa indicates the unit FBG number. The ordinate of FIG. 3A indicates the reflectance from each unit FBG, and the ordinate of FIG. 3B indicates the intensity of the chip pulse which is output from each unit FBG in an arbitrary scale.

Since the level Δn of the refractive index modulation simply increases along the wave guiding direction (x direction) of the optical fiber 36, the reflectance of the unit FBG increases as the unit FBG number increases, as shown in FIG. 3A. In other words, the reflectance of the unit FBG increases as the position of the FBG becomes closer to the right end of the optical fiber 36. Since the unit FBGs are arrayed like this, as shown in FIG. 3B, the intensities of the chip pulses which are output from each unit FBG can be equalized. The reason for this follows.

In other words, the optical pulse that enters the SSFBG is Bragg-reflected by the first unit FBG (unit FBG 1), and when the optical pulse enters the second unit FBG (unit FBG 2), the intensity thereof has been decreased for the amount of the intensity of the Bragg-reflected light at the first unit FBG. Therefore if the reflectance is set the same for all 15 unit FBGs, the intensity of the Bragg-reflected light at the second unit FBG becomes lower than the intensity of the Bragg-reflected light at the first unit FBG. In this way, the intensity of the Bragg-reflected light from each unit FBG sequentially decreases in the sequence of first to fifteenth unit FBG.

Therefore by simply increasing the refractive index modulation intensities of the 15 unit FBGs arrayed in series along the wave guiding direction of the optical fiber in this configuration, it is set that the Bragg reflectance of each unit FBG simply increases sequentially from the first to fifteenth unit FBG. By this, the Bragg reflectance can be increased so as to compensate the decrease of incident intensity to each unit FBG. And all the intensities of the Bragg-reflected lights from the first to fifteenth FBGs (intensities of chip pulses to be output) can be equalized.

If all the intensities of the chip pulses which are output from the first to fifteenth unit FBGs can be equalized, the time-based waveform of the encoded optical pulse string can be closer to becoming flat with respect to the time base. In other words, the encoded optical pulse is time-spread at an equal intensity by the encoder within a spreading time. If the optical pulse is time-spread to be a chip pulse string having equal intensity within the spreading time, the energy of the optical pulse can be more efficiently converted into an encoded optical pulse string compared with the case when the optical pulse is time-spread unequally. Also as mentioned later, if the SSFBG optical pulse time spreader is used as a decoder, the ratio of the peak and sub-peak of the auto-correlation waveform can be increased, and the reliability to identify the signal can be increased (e.g. see Koji Matsushima, Xu Wang, Satoko Kutsuzawa, Akihiko Nishiki, Saeko Oshiba, Naoya Wada and Ken-ichi Kitayama: "Experimental Demonstration of Performance Improvement of 127-Chip SSFBG En/Decoder Using Apodization Technique", IEEE Photonics Technology Letters, Vol. 16, No. 9, pp. 2192-2194, September 2004). If the peak of the auto-correlation waveform is a signal, the sub-peak is a noise, so the ratio of the peak and sub-peak can be regarded as the S/N ratio (Signal-to-Noise Ratio).

However in the above mentioned conventional SSFBG, the chip pulses to be output are not always generated by a single Bragg reflection from a unit FBG (hereafter may be called a "single reflection"), but include those generated by an odd count of Bragg reflections. Therefore even if the refractive index modulation intensity of the periodic refractive index modulation structure forming the unit FBGs arrayed in series along the wave guiding direction of the optical fiber is simply increased along the wave guiding direction of the optical fiber, the optical pulses to be input are not always output as a chip pulse string time-spread at equal intensity.

This will be described with reference to FIGS. 4A to 4C FIGS. 4A to 4C are diagrams for explaining the effect of multiple reflection on the output chip pulse intensity generated in the unit FGB. The abscissa of FIGS. 4A to 4C indicates a time base in an arbitrary scale, and the ordinate, which is omitted, indicates the light intensity in an arbitrary scale.

FIGS. 4A to 4C show the time-based waveform of a chip pulse string, which is output from the SSFBG as a Bragg-reflected light when one optical pulse is input to the SSFBG. FIG. 4A shows a time-based waveform of the chip pulse string which is generated from each unit FBG by a single reflection. FIG. 4B shows a time-based waveform of the chip pulse string generated from each unit FBG by the triple Bragg reflection (hereafter may be called "triple reflection"). FIG. 4C shows a time-based waveform of a chip pulse string which is output from the SSFBG as a result of superimposing and interfering of the chip pulse string which is generated from each unit FBG by a single reflection and the chip pulse string which is output by a triple reflection.

The generation of the chip pulse string which is output from each unit FBG by triple reflection will be described.

The optical pulse which is input to the SSFBG is first Bragg-reflected by the first unit FBG (unit FBG 1), and is output. This is the chip pulse indicated by "1" in FIG. 4A. Then the optical pulse is Bragg-reflected by the second unit FBG (unit FBG 2), and is output. This is the chip pulse indicated by "2" in FIG. 4A. In the SSFBG comprised only of 2 unit FBGs, a chip pulse, which is output by triple reflection, does not exist. In FIG. 4A, the chip pulses indicated by "3"

and "15" are chip pulses by single reflection, which are Bragg-reflected by unit FBG 3 to unit FBG 15 respectively, and are output. The numbers 1 to 15, which are assigned to each chip pulse as "1" to "15" in FIG. 4A, may be called "chip numbers".

The chip pulse with chip number 3 in FIG. 4A is a chip pulse which is Bragg-reflected by the third unit FBG (unit FBG 3), and is output. The chip pulse with chip number 3 in FIG. 4B is reflected by unit FBG 2, and is reflected by unit FBG 1, and is reflected again by unit FBG 2, and is output, which is a triple reflection chip pulse. The chip pulse with chip number 4 in FIG. 4B is a result of interference of the total 3 chip pulses, that is, a triple reflection chip pulse which is reflected by unit FBG 2, is reflected by unit FBG 1, and is reflected again by unit FBG 3, then is output, a triple reflection chip pulse which is reflected by unit FBG 3, is reflected by unit FBG 1, and is reflected again by unit FBG 2, then is output, and a triple reflection chip pulse which is reflected by unit FBG 3, is reflected by unit FBG 2, and is reflected again by unit FBG 3, then is output. This is the same for chip pulses with chip numbers 5 to 15 in FIG. 4B.

In other words, the chip pulse with chip number k in FIG. 4B includes the triple reflection chip pulse which is reflected by unit FBG (k−1), is reflected by unit FBG (k−2), and is reflected again by unit FBG (k−1), then is output, and is all of the triple reflection chip pulses which are generated by three times of Bragg-reflections between a set of two unit FBGs selected from (k−1) number of unit FBGs from unit FBG 1 to unit FBG (k−1), and is output for the k-th time. Here k is an integer in the 3 to 15 range.

FIG. 4C shows the time-based waveform of the intensity of the chip pulse string, which is given by a square of the sum of the amplitude of the chip pulse shown in FIG. 4A, and the amplitude of the chip pulse shown in FIG. 4B. As FIG. 4C shows, if a chip pulse which is output by an odd count of Bragg reflections exists, the optical pulse to be input is not always output as a chip pulse string which was time-spread at equal intensity, even if the unit FBGs are arrayed so that the reflectance increases sequentially along the wave guiding direction of the optical fiber. In other words, in order to output the optical pulse as a chip pulse string which was time-spread at an equal intensity, it is not sufficient merely to array the unit FBGs so that the reflectance increases sequentially along the wave guiding direction of the optical fiber.

The result of quantitatively computing and confirming the contents of the above description is shown in FIGS. 5A and 5B. FIGS. 5A and 5B are simulation results on the intensity of a chip pulse string which is output from an SSFBG. The abscissa of FIGS. 5A and 5B indicates the chip number. The ordinate of FIG. 5A indicates the intensity of the chip pulse, and the ordinate of FIG. 5B indicates the phase of the chip pulse. The chip pulse of which phase is "−1" in the ordinate of FIG. 5B and the chip pulse of which phase is "1" are in an opposite phase relationship. In other words, the phase difference of the chip pulse of which phase is "−1" and the chip pulse of which phase is "1" is π.

In FIG. 5A, a chip pulse generated by a single reflection is indicated by a white circle, and a chip pulse generated by a triple reflection is indicated by an ×. And a chip pulse determined as a sum of the chip pulses generated by a single reflection and a triple reflection is indicated by a black dot. In FIG. 5B, a chip phase of a chip pulse generated by a single reflection is indicated by a white circle, and a phase of a chip pulse generated by a triple reflection is indicated by an ×.

As the white circles in FIG. 5A show, the intensities of the chip pulses generated by a single reflection are equalized, but as the black dots show, the intensities of chip pulses determined as the sum of the chip pulses generated by a single reflection and a triple reflection, that is chip pulses which are output from SSFBG, disperse. This is because if the phase of the chip pulse generated by a single reflection and a phase of the chip pulse which is output by a triple reflection are in an opposite phase relationship, the intensity of the chip pulse which is determined as the sum thereof and which is output from SSFBG is weakened.

As described with reference to FIGS. 1A to 1E, the decoder using SSFBG re-encodes the chip pulse string which was generated by being encoded, so as to regenerate the optical pulse from the chip pulse string which was encoded and generated by the encoder. If the intensity of the chip pulse string generated by the optical pulse being time-spread by SSFBG is not uniform, this chip pulse of which intensity is not uniform is re-encoded by the decoder using SSFBG. By this re-encoding by the decoder as well, the intensity of the generated chip pulse string is not uniform, so the optical pulse regenerated by the decoder does not have an ideal time-based waveform which has a single peak. The case when the code length is 15 was described above, but needless to say, the above description is valid even when the code length is other than 15.

SUMMARY OF THE INVENTION

With the foregoing in view, it is an object of the present invention to provide an SSFBG optical pulse time spread which can generate a chip pulse string of which intensities of the chip pulses are all equalized, even if chip pulses generated by an odd count of reflections exist.

To achieve the above object, the present invention provides an optical pulse time spreader having the following configuration. The optical pulse time spreader of the present invention is an optical pulse time spreader comprising phase control means for time-spreading an optical pulse to be a string of chip pulses sequentially arrayed on a time base by encoding using an optical phase code, and generating and outputting the chip pulse string, and has the following characteristics.

In other words, this phase control means comprises unit diffraction gratings, which correspond to the code values constituting the optical phase code one-to-one, arrayed in a row from the first to J-th unit diffraction grating (J is 3 or higher integer) sequentially from an input end of an optical wave guide along a wave guiding direction of the optical wave guide. And the reflectance of each of the unit diffraction gratings is set so that all the intensities of the first to J-th chip pulses, which are sequentially output from the phase control means, are equalized.

Here the first chip pulse is a chip pulse which is generated and output by a Bragg reflection at the first unit diffraction grating. The second chip pulse is a chip pulse which is generated and output by a Bragg reflection at the second unit diffraction grating. The k-th chip pulse, where k is an integer that satisfies 3≦k≦J, is a chip pulse generated as a result of interference between a single reflection chip pulse which is generated and output by a single Bragg reflection at the k-th unit diffraction grating and output for the k-th time and an odd count of reflection chip pulse which is generated and output by an odd count of a Bragg reflection from the unit diffraction gratings.

It is preferable that reflectances $R_1$, $R_2$ and $R_k$ of the first, second and k-th unit diffraction gratings are set as the following formulas respectively.

$$R_1 = P_c \text{(constant)} \tag{a}$$

$$R_2 = P_c/(1-R_1)^2 \tag{b}$$

$$R_k = (P_c^{1/2} - P_k^{1/2})^2 / \{(1-R_1)^2 \cdot (1-R_2)^2 \ldots (1-R_{k-1})^2\} \quad \text{(c-1)}$$

$$R_k = (P_c^{1/2} + P_k^{1/2})^2 / \{(1-R_1)^2 \cdot (1-R_2)^2 \ldots (1-R_{k-1})^2\} \quad \text{(c-2)}$$

Here $P_c$ is an arbitrary constant which is set as an intensity of the chip pulse which is reflected from the first unit diffraction grating, and is output from the phase control means. The intensities of all the J number of chip pulses which are output from the phase control means are equalized to the $P_c$ intensity of the chip pulse, which is reflected by the first unit diffraction grating and is output from the phase control means.

$P_k$ is an intensity of a triple reflection chip pulse, which is output for the k-th time from the phase control means. The formula (c-1) expresses the reflectance of the k-th unit diffraction grating when the phase difference between the single reflection chip pulse which is generated by a single reflection and is output for the k-th time, and the triple reflection chip pulse which is generated by a triple reflection and is output for the k-th time is 2Pπ (P is an integer). And the formula (c-2) expresses the reflectance of the k-th unit diffraction grating when the phase difference between the single reflection chip pulse which is generated by a single reflection and is output for the k-th time, and the triple reflection chip pulse which is generated by a triple reflection and is output for the k-th time is (2Q+1)π (Q is an integer).

The phase control means is constructed by arraying the first to J-th unit diffraction gratings so that a phase difference of Bragg-reflected lights from two of the unit diffraction gratings, which are laterally adjacent to each other and provide the same code values, is given by $$2M\pi \quad (1)$$

and a phase difference of Bragg-reflected lights from two of the unit diffraction gratings, which are laterally adjacent to each other and provide different code values, is given by $$(2N+1)\pi \quad (2)$$

(where M and N are integers).

It is preferable that the refractive index modulation intensity of a periodic refractive index modulation structure of the unit diffraction grating is apodized by a window function. Specifically, this window function can be a Gaussian error function.

It is preferable that the optical wave guide arraying the unit diffraction grating is an optical fiber in order to implement the phase control means.

According to the optical pulse time spreader of the present invention, the reflectance of each unit diffraction grating constituting the phase control means is set so that all the intensities of the total J number of chip pulses, that is the intensity of the first chip pulse, intensity of the second chip pulse and intensity of the k-th chip pulse, are equalized, so if an optical pulse is input to the optical time spreader of this invention, the intensities of all the chip pulses to be output are equalized.

In the case of using the optical pulse time spreader as an encoder, the above mentioned chip pulse string, which is a pulse string generated by the input optical pulse being encoded by the optical phase code being set in the optical pulse time spreader and being output, may be called an "encoded optical pulse string". Detailed description thereof will be later, but if the intensities of the chip pulses to be output from the optical pulse time spreader are all equalized, the ratio of the peak and sub-peak of the auto-correlation waveform can be increased when the optical pulse time spreader is used as an encoder and decoder, and therefore reliability in identifying the signal can be increased.

In the phase control means, the J number of unit diffraction gratings are arrayed in a row along the wave guiding direction of the wave guide, with the numbers 1 to J sequentially assigned from the input end to the other end of the optical wave guide, and each reflectance $R_1$, $R_2$ and $R_k$ of the first, second and k-th unit diffraction gratings are set as given by the above formulas (a), (b), (c-1) and (c-2), so the chip pulse string of which intensities of the chip pulses to be output from the phase control means are all equalized can be generated, even if a triple reflection chip pulse generated by the triple reflection exists.

If the first to J-th unit diffraction gratings are sequentially arrayed so that the phase difference between Bragg-reflected lights from the two unit diffraction gratings which are laterally adjacent to each other and provide the same code values, and the phase difference between Bragg-reflected lights from the two unit diffraction gratings which are laterally adjacent to each other and provide different code values are given by the above mentioned Formula (1) and Formula (2) respectively, then the chip pulse string can be generated and output as the encoded optical pulse string by time spreading the input optical pulse based on the binary phase code.

By apodizing the refractive index modulation intensity of the periodic refractive index modulation structure of the unit diffraction grating by a window function, a concentrated Bragg reflection occurs at the center of the unit FBG, and as a result, a half width of the time-based waveform of the generated Bragg-reflected lights becomes small. In other words, the half width of the chip pulse constituting the encoded optical pulse string is expected to be small, so decreasing an overlap of the bottom areas of the adjacent chip pulses constituting the encoded optical pulse string on the time base can be expected. If the overlap of the bottom areas of the chip pulses can be decreased, the effect of interference due to the overlapping of the bottom areas of the chip pulses on the time base can be decreased. As a result, the ratio of the peak and sub-peak of the auto-correlation waveform can be further increased, and reliability in identifying the signal can be improved.

If apodizing is performed by a Gaussian error function, the refractive index modulation can be at the maximum at the center of the unit FBG, because of the nature of the Gaussian error function. In other words, a concentrated Bragg reflection occurs at the center of the unit FBG, and as a result, a half width of the time-based waveform of the generated Bragg-reflected light can be decreased.

The transmission line of the optical communication is constructed by an optical fiber, so if the optical wave guide in which the unit diffraction gratings are arrayed is an optical fiber, it is often convenient to install this optical pulse time spreader in the optical communication system as an encoder and decoder.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Embodiments of the present invention will now be described with reference to the drawings. Each drawing, however, is for illustrating one configuration example of the present invention, and a cross-sectional profile and the positional relationship of each composing element are shown roughly, only to assist in understanding the present invention, and therefore shall not limit the present invention to the illustrated examples. Also in the following description, specific materials and conditions may be used, but these materials and conditions are only one of the preferred examples, and the present invention shall never be limited to these.

In the following description, the case of forming the phase control means using an optical fiber will be used, but the phase control means is not limited to optical fiber, but may be formed using a flat type optical wave guide, for example.

<Reflectance of Unit FBG>

The optical pulse time spreader of the present invention is an optical pulse time spreader comprising a phase control means for time-spreading an optical pulse to be a string of chip pulses sequentially arrayed on the time base by encoding using an optical phase code, and generating and outputting the chip pulse string. The optical pulse time spreader of the present invention is an optical pulse time spreader which uses an SSFBG comprised of unit FBGs arrayed along the wave guide direction of the optical fiber as the phase control means.

The characteristic of the SSFBG of the present invention is that the unit FBGs, which correspond to the code values constituting the optical phase code one-to-one, are arrayed in a row along the wave guiding direction of the optical wave guide, and the phase difference between the Bragg-reflected lights from the two unit diffraction gratings, which are laterally adjacent to each other, is set as follows.

The phase difference between the Bragg-reflected lights from the two unit diffraction gratings which are laterally adjacent to each other and provide same code values is set to be $$2M\pi \quad (1).$$

The phase difference between the Bragg-reflected lights from the two unit diffraction gratings which are laterally adjacent to each other and provide different code values is set to be $$(2N+1)\pi \quad (2).$$

Here M and N are integers.

In the SSFBG of this invention, each reflectance of the unit diffractive gratings is set so that all the intensities of the chip pulses constituting the chip pulse string which is generated and output are equalized.

Figure 6:
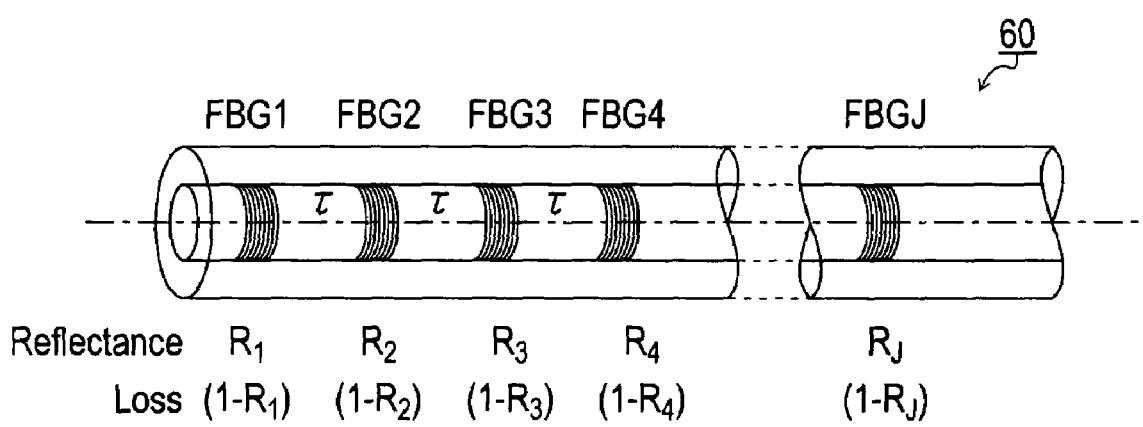
FIG. 6 is a diagram for explaining the method for calculating the reflectance of a unit FBG.

Now a method of calculating each reflectance of the unit diffraction gratings so that all the chip pulse intensities are equalized will be described with reference to FIG. 6. FIG. 6 is a diagram for explaining a method of calculating the reflectance of the unit FBG constituting the unit diffraction gratings, and is a cross-sectional view sectioned along the wave guiding direction of SSFBG 60, which is the phase control means. In the SSFBG 60, the unit FBGs numbers as No. 1 to No. J are arrayed sequentially from the input end (left end in FIG. 6). For the first unit FBG, which is FBG 1, to the unit FBG J, are sequentially arrayed with an interval $\tau$, which is a unit converted into a phase of light.

When the phase $\tau$ is converted into an actual geometric interval L, $\tau=(2\pi/\lambda)n_{eff}L$, so $L=\tau\lambda/(2\pi n_{eff})$. Here $n_{eff}$ is an effective refractive index when the light propagates the optical wave guide (core in the case of optical fiber). In the following description, interval $\tau$ is used regardless whether the value is a phase value or a value when the phase value is converted into a geometric interval, since it is not necessary to strictly distinguish a phase value $\tau$ and value $\tau\lambda/(2\pi n_{eff})$ when the phase value $\tau$ is converted into an actual geometric interval.

The interval $\tau$ between adjacent unit FBG i and unit FBG (i+1) is determined by the optical code, which is set for SSFBG 60, which is the phase control means. Generally the interval $\tau i$ between adjacent unit FBG i and unit FBG (i+1), and the interval $\tau j$ between adjacent unit FBG j and unit FBG (j+1) are different, that is $\tau i \neq \tau j$. Here i and j are integers which satisfy $1 \leq i \leq (j-1)$ and $1 \leq j \leq (j-1)$ respectively, and $i \pm j$. However in the following description, the interval of adjustment unit FBG i and unit FBG (i−1) is not noted as $\tau i$ adding the identification parameter i, but the intervals of adjacent unit FBGs are all noted as $\tau$, regardless parameter i, since it is not necessary to identify $\tau i$ and $\tau j$.

The first chip pulse and second chip pulse to be output from SSFBG 60 line up with the time interval when the phase $2\tau$ is converted into time on the time base. This is because of the following reason. When an optical pulse is input to SSFBG 60, the first chip pulse is Bragg-reflected by FBG 1 and output, and the second chip pulse is Bragg-reflected by FBG 2 and output. Therefore the second chip pulse delays by the time when phase $2\tau$, to pass back and forth between FBG 1 and FBG 2, is converted into time. In other words, the i-th chip pulse and the (i+1)th chip pulse, which are adjacent to each other, line up with a time interval when the phase $2\tau$ is converted into time on the time base.

Generally when phase $\tau$ is converted into time t, $2\pi (n_{eff}/\lambda) t = \tau$, so $t = \tau \lambda/(2\pi n_{eff} c)$. Here $n_{eff}$ is an effective refractive index when light propagates the optical wave guide (core in the case of optical fiber), and c is a speed of light in a vacuum. In the following description, it is not necessary to strictly distinguish phase $\tau$ and the value when the phase is converted into time, that is $\tau \lambda/(2\pi n_{eff} c)$, so time interval $\tau$ or delay time $\tau$ is used without commenting that the value is a phase value or a value when the phase value is converted into time.

In SSFBG 60, as shown in FIG. 6, J number of unit diffraction gratings numbered No. 1 to No. J are arrayed sequentially from one end, which is the input end of the optical wave guide, to the other end, in a row along the wave guiding direction of the optical wave guide. All the chip pulse intensities to be output can be equalized by setting the reflectances $R_1$, $R_2$ and $R_k$ of the first, second and k-th unit diffraction gratings respectively as the following formulas.

$$R^1 = P_c/P_{in} \quad (a')$$

$$R_2 = P_c/(1-R_1)^2 \quad (b)$$

$$R_k = (P_c^{1/2} - P_k^{1/2})^2/\{(1-R_1)^2 \cdot (1-R_2)^2 \ldots (1-R_{k-1})^2\} \quad (c\text{-}1)$$

$$R_k = (P_c^{1/2} + P_k^{1/2})^2/\{(1-R_1)^2 \cdot (1-R_2)^2 \ldots (1-R_{k-1})^2\} \quad (c\text{-}2)$$

Here $P_{in}$ is an intensity of the optical pulse to be input to the phase control means, and if $P_{in}$ is specified as $P_{in}=1$, then the above formula (a) is given by $$R_1 = P_c (\text{constant}) \quad (a)$$

The formula (a') is expressed with parameter Pin remaining, so as to clearly know that $R_1$ is reflectance, but the respective reflectances $R_2$ and $R_k$ of the second and k-th unit diffraction gratings are expressed with specifying $P_{in}=1$, as mentioned later.

The constant $P_c$ is a value which is set as the intensity of the chip pulse, which is reflected from the first unit diffraction grating, and is output from the phase control means, and in the present invention, the reflectance of each unit diffraction grating is set so that all the intensities of the chip pulses to be output from the phase control means are equalized to this value.

$P_k$ is an intensity of the triple reflection chip pulse to be output from the phase control means. Formula (c-1) and Formula (c-2) express the reflectance of the k-th unit diffraction grating when the phase difference between the single reflection chip pulse which is generated by a single reflection and is output for the k-th time and the triple reflection chip pulse which is generated by a triple reflection and is output for the k-th time is 0 (same phase), and is $\pi$ (opposite phase) respectively.

The cases when the phase difference between a chip pulse generated by a single reflection and a chip pulse generated by a triple reflection is 0 (same phase) and $\pi$ (opposite phase) generally means the case when the phase difference is $2P\pi$, where P is an integer, and the case when the phase difference is $(2Q+1)\pi$, where Q is an integer respectively. However in the following description, the contents of the description are not changed even if P=Q=0, so cases when the phases of the chip pulse generated by a single reflection and the chip pulse generated by a triple reflection are the same and opposite (phase difference is $\pi$) means that the cases when the phase difference thereof is 0 and $\pi$ respectively.

By setting the respective reflectances of the unit diffraction gratings as above, the intensities of all the chip pulses constituting the chip pulse string to be generated and output are equalized, and the reason for this will now be described.

If an optical pulse of which intensity if $P_{in}$ is input to SSFBG 60, Bragg reflection occurs by the FBG 1, and the first chip pulse of which intensity is $P_c$ is generated and output. The reflectance of FBG 1 at this time is given by $R_1 = P_c/P_{in}$. The second chip pulse is a chip pulse generated by Bragg reflection by the FBG 2. The generation steps of the second chip pulse are as follows.

An optical pulse of which intensity is $P_{in}$ is input to the SSFBG 60, passes through the FBG 1, is Bragg-reflected by FBG 2, and passes through FBG 1 again, and is output. When the optical pulse of which intensity is $P_{in}$ passes through FBG 1 first, the intensity thereof becomes $(1-R_1)P_{in}$, and when the optical pulse is Bragg-reflected by FBG 2, the intensity thereof becomes $(1-R_1) \cdot R_2 \cdot P_{in}$. When this optical pulse passes through FBG 1 again, the intensity thereof becomes $(1-R_1) \cdot R_2 \cdot (1-R_1) \cdot P_{in} = (1-R_1)^2 \cdot R_2 \cdot P_{in}$. This intensity $(1-R_1)^2 \cdot R_2 \cdot P_{in}$ must be the same as $P_c$, $(1-R_1)^2 \cdot R_2 \cdot P_{in} = P_c$, which means the reflectance $R_2$ of FBG 2 is given by $R_2 = P_c/\{(1-R_1)^2 \cdot P_{in}\}$.

To simplify the calculation herein below, the intensity $P_{in}$ of the input optical pulse is set to 1 for description. Since $P_{in}=1$, $R_2 = P_c/\{(1-R_1)^2 \cdot P_{in}\} = P_c/(1-R_1)^2$. The respective reflectances $R_1$, $R_2$ and $R_k$ of the first, second and k-th unit diffraction gratings are values which are defined without depending on the intensity $P_{in}$ of the input optical pulse, so setting the intensity $P_{in}$ of the input optical pulse to 1 does not influence the calculation result.

Then the reflectance $R_3$ of FBG 3 is determined. The intensity $P_3'$ of a chip pulse which is to be output by Bragg reflection occurred once in FBG 3, that is a single reflection chip pulse which is generated by a single reflection and is output for the third time, is given by Formula (3).

$$P_3' = (1-R_1)^2 \cdot (1-R_2)^2 \cdot R_3 \quad (3)$$

The intensity P3 of the triple reflection pulse which overlaps with this single reflection chip pulse is given by the following Formula (4).

$$P_3 = (R_2^2 \cdot R_1) \cdot (1-R_1)^2 \quad (4)$$

This triple reflection chip pulse is a chip pulse which is transmitted through FBG 1 (transmittance $1-R_1$), Bragg-reflected by FBG 2 (reflectance $R_2$, first reflection), Bragg-reflected by FBG 1 (reflectance $R_1$, second reflection), Bragg-reflected again by FBG 2 (reflectance $R_2$, third reflection), and is transmitted through FBG 1 (transmittance $1-R_1$), and is output.

In other words, if the intensity of the input optical pulse is 1, the intensity thereof becomes $(1-R_1)$ when the optical pulse transmits through FBG 1. When the optical pulse of which intensity is $(1-R_1)$ is Bragg-reflected by FBG 2, the intensity of the reflected light becomes $(1-R_1) \times R_2$. When the optical pulse of which intensity is $(1-R_1) \times R_2$ is Bragg-reflected the second time by FBG 1, the intensity thereof becomes $(1-R_1) \times R_2 \times R_1$. When the optical pulse of which intensity is $(1-R_1) \times R_2 \times R_1$ is Bragg-reflected the third time by FBG 2, the intensity thereof becomes $(1-R_1) \times R_2 \times R_1 \times R_2$. When the optical pulse of which intensity is $(1-R_1) \times R_2 \times R_1 \times R_2$ transmits through FBG 1, the intensity thereof becomes $(1-R_1) \times R_2 \times R_1 \times R_2 \times (1-R_1)$.

Therefore the intensity $P_3$ of the triple reflection chip pulse which overlaps the single reflection chip pulse which is output for the third time becomes $(1-R_1) \times R_2 \times R_1 \times R_2 \times (1-R_1) = (R_2^2 \cdot R_1) \cdot (1-R_1)^2$, and the Formula (4) is acquired.

The intensity of the chip pulse generated as a result of the single reflection chip pulse overlapping the triple reflection chip pulse is given by a square of the sum of the amplitudes of both chip pulses if the phases of the single reflection chip pulse and the triple reflection chip pulse are the same (phase difference is 0). In other words, the amplitude of the intensity $P_3'$ of the chip pulse which is generated by the single reflection and is output for the third time is $P_3'^{1/2}$, and the amplitude of the intensity $P_3$ of the chip pulse generated by the triple reflection is $P_3^{1/2}$, so the intensity of the chip pulse generated as a result of the chip pulse generated by a single reflection overlapping the chip pulse generated by a triple reflection is given by the following Formula (5).

$$(P_3'^{1/2}+P_3^{1/2})^2 \quad (5)$$

If the phases of the single reflection chip pulse and the triple reflection chip pulse are the opposite (phase difference is $\pi$), the intensity of the chip pulse is given by the square of the difference of the amplitudes of these chip pulses. Therefore the intensity of the chip pulse generated as a result of the chip pulse generated by a single reflection overlapping the chip pulse generated by a triple reflection is given by the following Formula (6).

$$(P_3'^{1/2}-P_3^{1/2})^2 \quad (6)$$

The intensity of the chip pulse generated as a result of the single reflection chip pulse overlapping the triple reflection chip pulse at the same phases is given by Formula (5), that is $(P_3^{1/2}+P_3'^{1/2})^2$. So this value must be the same as the intensity $P_c$ of the chip pulse which is reflected from the first unit diffraction grating and is output, for the intensities of the chip pulse string to be equalized.

In other words, $P_c=(P_3^{1/2}+P_3'^{1/2})^2$ is the condition for the intensities of the chip pulse string to be output to be equalized. This is transformed into $P_3'=(P_c^{1/2}-P_3^{1/2})^2$. Since the intensity $P_3'$ of the single reflection chip pulse to be output for the third time is given by Formula (3), the following Formula (7) can be acquired by substituting Formula (3) for this formula that is, $P_c=(P_3^{1/2}+P_3'^{1/2})^2$.

$$(1-R_1)^2 \cdot (1-R_2)^2 \cdot R_3 = (P_c^{1/2}-P_3^{1/2})^2 \quad (7)$$

therefore $$R_3 = \{(P_c^{1/2}-P_3^{1/2})^2\}/\{(1-R_1)^2 \cdot (1-R_2)^2\} \quad (8)$$

In the same way, if the phases of the single reflection chip pulse and the triple reflection chip pulse are opposite (phase difference is $\pi$), then $$R_3 = \{(P_c^{1/2}+P_3^{1/2})^2\}/\{(1-R_1)^2 \cdot (1-R_2)^2\} \quad (8')$$

Now the intensity of the fourth and later chip pulses to be output from the SSFBG 60 will be considered. Table 2 shows a list of unit FBGs related to the generation of chip pulses generated by the triple reflection out of the fourth and later chip pulses to be output from SSFBG 60.

TABLE 2

| Delay Time | Encoded Pulse String | Unit FBG Reflection Combination | | |
|---|---|---|---|---|
| | | First | Second | Third |
| 4 × τ | Third Chip | $R_2$ | $R_1$ | $R_2$ |
| 6 × τ | Fourth Chip | $R_2$ | $R_1$ | $R_3$ |
| | | $R_3$ | $R_1$ | $R_2$ |
| | | $R_3$ | $R_2$ | $R_3$ |
| 8 × τ | Fifth Chip | $R_2$ | $R_1$ | $R_4$ |
| | | $R_3$ | $R_1$ | $R_3$ |
| | | $R_3$ | $R_2$ | $R_4$ |
| | | $R_4$ | $R_1$ | $R_2$ |

TABLE 2-continued

| Delay Time | Encoded Pulse String | Unit FBG Reflection Combination | | |
|---|---|---|---|---|
| | | First | Second | Third |
| | | $R_4$ | $R_2$ | $R_3$ |
| | | $R_4$ | $R_3$ | $R_4$ |
| . | | | | |
| . | | | | |
| . | | | | |

The fourth chip pulse is output after the first chip pulse with a 6τ delay time. The fifth chip pulse is output after the first chip pulse with an 8τ delay time. The sixth and later chip pulses are also output in the same way.

The fourth chip pulse, which is generated by a single reflection and is output for the fourth time, is a chip pulse generated by Bragg reflection by FBG 4. The chip pulse which is generated by the triple reflection and is output for the fourth time is output via three types of reflection routes, as shown in Table 2. For example, on the top level concerning the chip pulse which is output for the fourth time in Table 2, $R_2$, $R_1$ and $R_3$ are shown as the first, second and third. This means that these chip pulses are reflected by FBG 2, FBG 1 and FBG 3 sequentially, and are output. This is the same for the other two combinations.

The interval τ between adjacent unit FBGs is 0 or π, so the phase difference between a chip pulse which is generated and output by a single reflection and a chip pulse which is generated and output by a triple reflection is also 0 or π. The reason is as follows.

The delay time differences between the chip pulses which are output for the third, fourth and fifth times and the chip pulse which is output for the first time are 4τ, 6τ and 8τ respectively, as shown in Table 2. For example, in the case of the third chip pulse of which delay time difference is 4τ, $2^4(=16)$ combinations are possible from 4τ=τ+τ+τ+τ=0+0+0+0=0 to 4τ=τ+τ+τ+τ=π+π+π+π=4π, including 4τ=τ+τ+τ+τ=π+0+0+0=π and 4τ=τ+τ+τ+τ=π+π+π+0=3π, and for all these cases, the delay time difference can be converted into phase difference which is either 0 (same phase) or π (opposite phase). In other words, 2π and 4π are equivalent to phase difference 0, and 3π is equivalent to phase difference π. This is the same in the case of delay time differences 6τ and 8τ.

In the case of a chip pulse generated by a single reflection, on the other hand, the delay time differences between the chip pulse which is output for the first time and the chip pulses which are output for the third, fourth and fifth times are 4τ, 6τ and 8τ respectively, just like the above mentioned case of triple reflection chip pulses. However the path is different between a chip pulse which is generated and output by a single reflection and a chip pulse which is generated and output by a triple reflection. For example, the chip pulse which is generated by a single reflection and is output for the fourth time is transmitted through FBG 1 to FBG 3, is reflected by FBG 4, is transmitted through FBG 3 to FBG 1, and is output. The chip pulse which is generated by a triple reflection and is output for the fourth time, on the other hand, propagates three types of path combinations, which are different from the single reflection chip pulse, as shown in Table 2.

Therefore depending on this difference of paths, the phase difference between a chip pulse which is generated and output by a single reflection and a chip pulse which is generated and output by a triple reflection becomes either 0 or π.

Generally in the case of a k-th chip pulse, the reflectance $R_k$ of FBGk is given by the above Formulas (c-1) and (c-2). In other words, the intensity $P_k'$ of a single reflection chip pulse which is generated and output by a single reflection is given by $$P_k' = (1-R_1)^2 \cdot (1-R_2)^2 \ldots (1-R_{k-1})^2 \cdot R^k \quad (9)$$

The number of triple reflection chip pulses $N_k$, which are generated and output by a triple reflection and overlap the chip pulse which is generated by a single reflection and is output for the k-th time, is given by $$N_k = N_{k-1} + (k-2) \quad (10)$$

The interference of the intensity of $N_k$ number of chip pulses results in the intensity $P_k$ of the triple reflection chip pulse.

The intensities of a chip pulse generated as a result of a chip pulse which is generated and output by a single reflection overlapping a chip pulse which is generated and output by a triple reflection, when the chip pulse which is generated and output by a single reflection and a chip pulse which is generated and output by a triple reflection have the same phases, and when they have opposite phases, are given by $$(P_k'^{1/2} + P_k^{1/2})^2 \quad (11)$$

and $$(P_k'^{1/2} - P_k^{1/2})^2 \quad (11')$$

respectively.

These values must be the same as the intensity $P_c$ of the chip pulse, which is reflected and output from FBG 1 in order to equalize the intensities of the chip pulse string to be output. Since the condition to equalize the intensities is $P_c = (P_k'^{1/2} + P_k^{1/2})$ and $Pc = (P_k'^{1/2} - P_k^{1/2})$, then $$Pk' = (P_c^{1/2} - P_k^{1/2})^2 = (1-R_1)^2 \cdot (1-R_2)^2 \ldots (1-R_{k-1})^2 \cdot R_k$$

and $$Pk' = (P_c^{1/2} + P_k^{1/2})^2 = (1-R_1)^2 \cdot (1-R_2)^2 \ldots (1-R_{k-1})^2 \cdot R_k$$

by Formula (9). Therefore $$R_k = (P_c^{1/2} - P_k^{1/2})^2 / \{(1-R_1)^2 \cdot (1-R_2)^2 \ldots (1-R_{k-1})^2\} \quad (c\text{-}1)$$

and $$R_k = (P_c^{1/2} + P_k^{1/2})^2 / \{(1-R_1)^2 \cdot (1-R_2)^2 \ldots (1-R_{k-1})^2\} \quad (c\text{-}2)$$

are acquired.

Based on the result of considering the determined reflectances $R_1$, $R_2$ and $R_k$ of the first, second and k-th unit diffraction gratings respectively, the case of setting optical phase code of which code length is 15 will be described as an example. In other words, an example of the case of J=15 will be described.

Figure 7A:
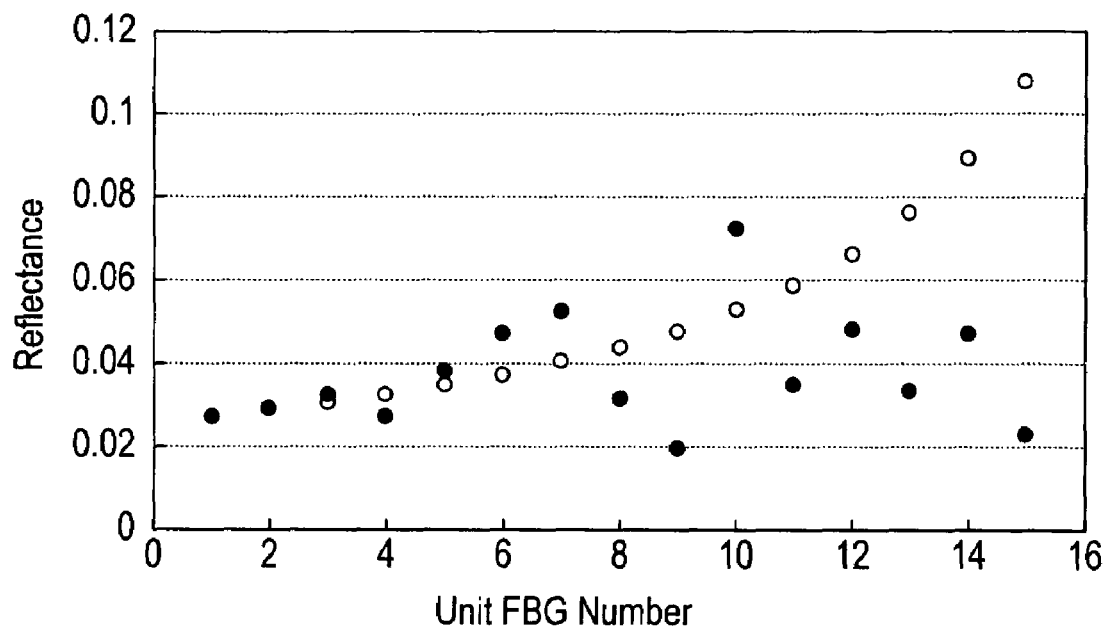
FIG. 7 are graphs depicting the reflectance of a unit FBG of the phase control means of the prior art and present invention.
Figure 7B:
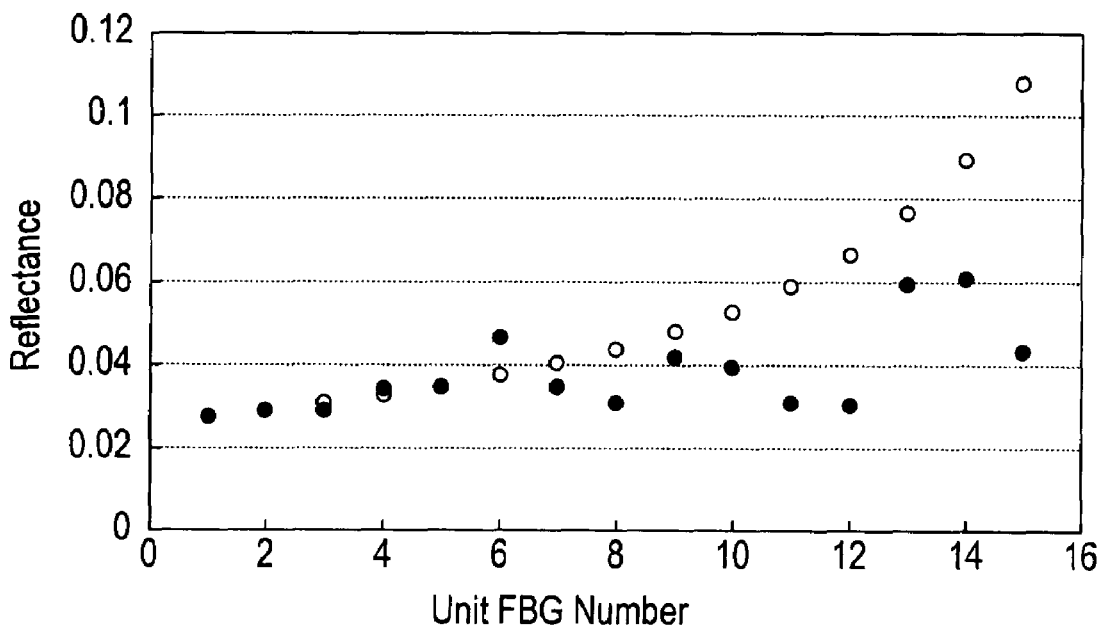

With reference to FIGS. 7A and 7B, it will be described how the reflectances of unit FBGs constituting the SSFBG are sequentially set from the unit FBG set at the input end along the wave guiding direction for the SSFBG of the prior art and SSFBG of the present invention respectively.

FIG. 7A is a case of setting the code (0, 0, 0, 1, 1, 1, 1, 0, 1, 0, 1, 1, 0, 0, 1), and FIG. 7B is a case of setting the code (1, 0, 0, 1, 1, 0, 1, 0, 1, 1, 1, 1, 0, 0, 0,). In these codes, the sequence of numbers in the code is reversed. In other words, one of the SSFBGs in which the above codes are set respectively function as an encoder, and the other functions as a decoder.

FIGS. 7A and 7B are graphs depicting the reflectances of unit FBGs constituting the SSFBG, which is a phase control means, of prior art and of the present invention. The abscissas of FIGS. 7A and 7B indicate the unit FBG number. The unit FBG positioned at position 1, which is the extreme left of the abscissa, is FBG 1, and then FBG 2 and FBG 3 are positioned sequentially, and unit FBG positioned at position 15, which is the extreme right, is FBG 15. The ordinate indicates the reflectance of each unit FBG. In FIGS. 7A and 7B, a white circle indicates the case of the SSFBG of the prior art, and a black dot indicates the case of the SSFBG of the present invention.

In FIGS. 7A and 7B, in the case of the SSFBG of the prior art, the reflectances of the unit FBGs to be installed are set such that the reflectance simply increases from the left end, which is the input end, of the optical pulse sequentially. This is based on the concept that the reflectances of the unit FBGs are increased sequentially from the input end, which is the left end, in order to equalize the intensity of Bragg-reflected light from each unit FBG, considering that the intensity of the optical pulse to be input to the SSFBG decreases every time the optical pulse passes through a unit FBG. However, as described above, chip pulses to be output from the SSFBG are not always generated and output from each unit FBG by a single reflection, but includes those generated and output by an odd count (triple) reflections. Therefore it is not sufficient to array unit FBGs so as to sequentially increase the reflectance along the wave guide direction of the optical fiber, in order to output the input optical pulse as a chip pulse string time-spread with equal intensities from the SSFBG.

Therefore according to the present invention, the reflectance of each unit FBG is determined considering that the chip pulses to be output from the SSFBG are not only those generated and output from each unit FBG by a single reflection, but include those generated and output by a triple reflection, and the result of determining the reflectance of each unit FBG according to this invention is indicated by the black dots in FIGS. 7A and 7B. The reflectance indicated by a black dot is calculated by Formula (a), Formula (b), Formula (c-1) and Formula (c-2), which consider chip pulses generated by triple reflection.

In the reflectances indicated by black dots in FIGS. 7A and 7B, the reflectance of each unit FBG does not simply increase, unlike the case of the SSFBG of the prior art. Also the codes being set are different, so the reflectance to be set in each FBG is not the same, as shown in FIGS. 7A and 7B. In other words, to use the SSFBGs of the present invention as an encoder and a decoder, the SSFBGs cannot function as an encoder and decoder simply by reverse setting the input and output ends, as in the case of using the SSFBGs in prior art. In other words, in order to use the SSFBGs of the present invention as an encoder and decoder, the reflectances of each unit FBG of the encoder and decoder must be calculated using Formula (a), Formula (b), Formula (c-1) and Formula (c-2) respectively.

According to the phase control means of the optical pulse time spreader of the present invention, the reflectances of the unit diffraction gratings which are arrayed in a row along the wave guiding direction of the optical wave guide are determined considering the presence of chip pulses generated and output by a triple reflection, as mentioned above. For certain chip pulses generated and output by 5 times or more of odd count of multiple reflections also exist, but as mentioned later, it was confirmed that it is sufficient to consider the presence of chip pulses generated and output by a triple reflection.

Based on the reflectances determined using the above mentioned Formulas (a), (b), (c-1) and (c-2), the level $\Delta n$ of the refractive index modulation of each unit diffraction grating is set, and the characteristic of the chip pulse string to be output was checked, and the result will be described below.

FIRST EMBODIMENT

Figure 8A:
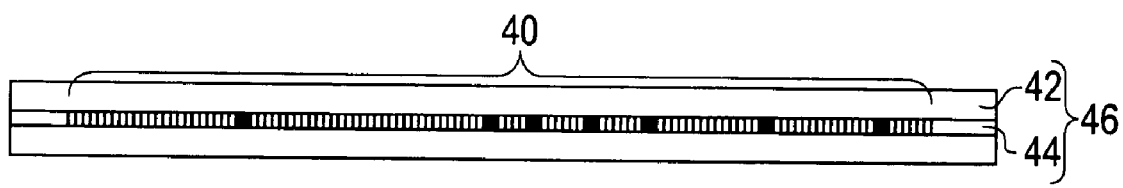
FIG. 8 are diagrams depicting the general structure of the phase control means of the optical pulse time spreader of the first embodiment.

The structure of an SSFBG 40 as a phase control means of an optical pulse time spreader of a first embodiment will be described with reference to FIGS. 8A to 8C. FIG. 8A is a cross-sectional view of the SSFBG 40, where 15 unit FBGs are arrayed in series in a core 44 of an optical fiber 46 comprising the core 44 and clad 42, along the wave guiding direction of the core 44, which is an optical wave guide of the optical fiber 46.

Figure 2A:
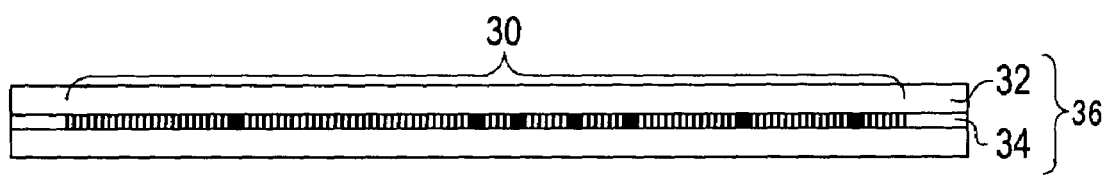
FIG. 2 are diagrams depicting a general structure of the phase control means of a conventional optical pulse time spreader.
Figure 2B:
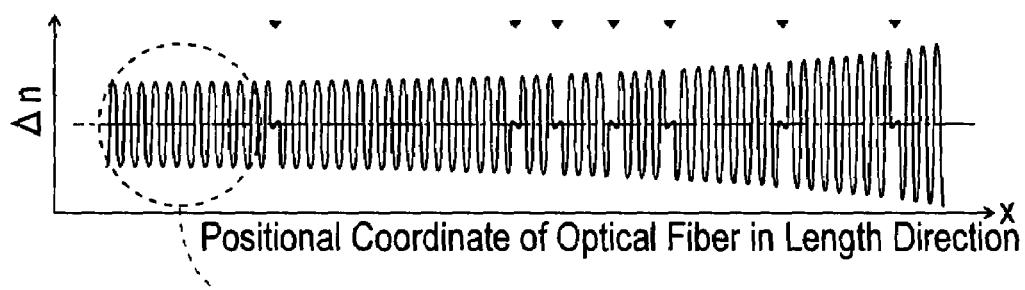
Figure 2C:
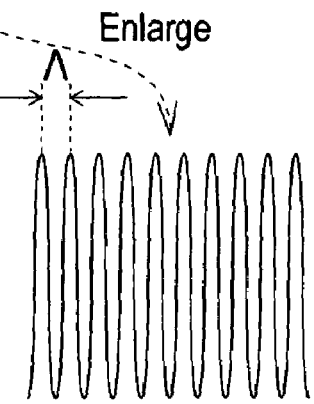
Figure 3A:
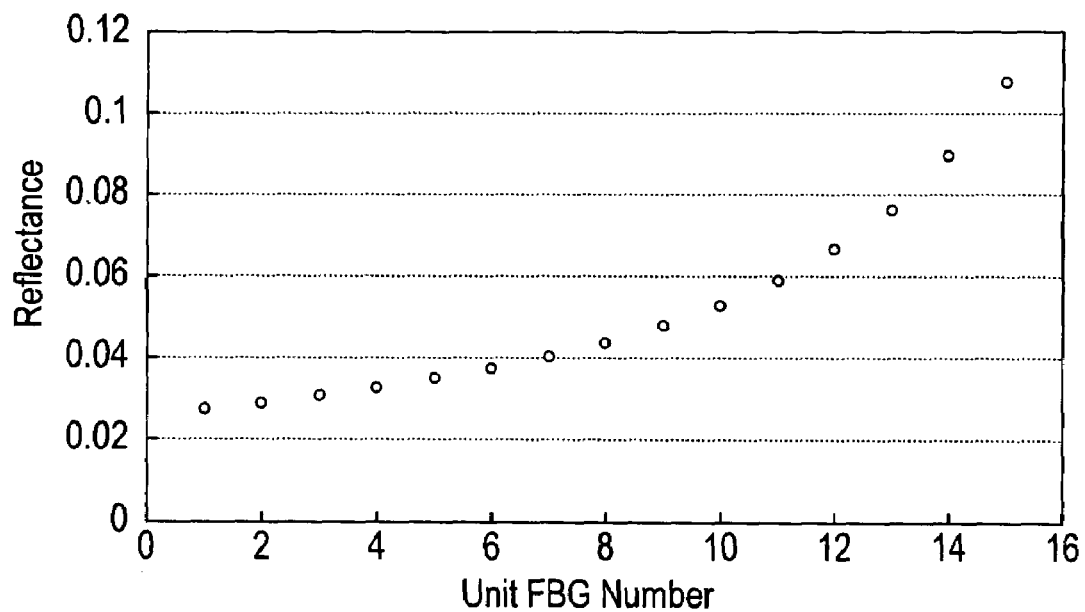
FIG. 3 are graphs depicting the reflectance of each unit FBG and intensity of the output chip pulse from each unit FBG.
Figure 3B:
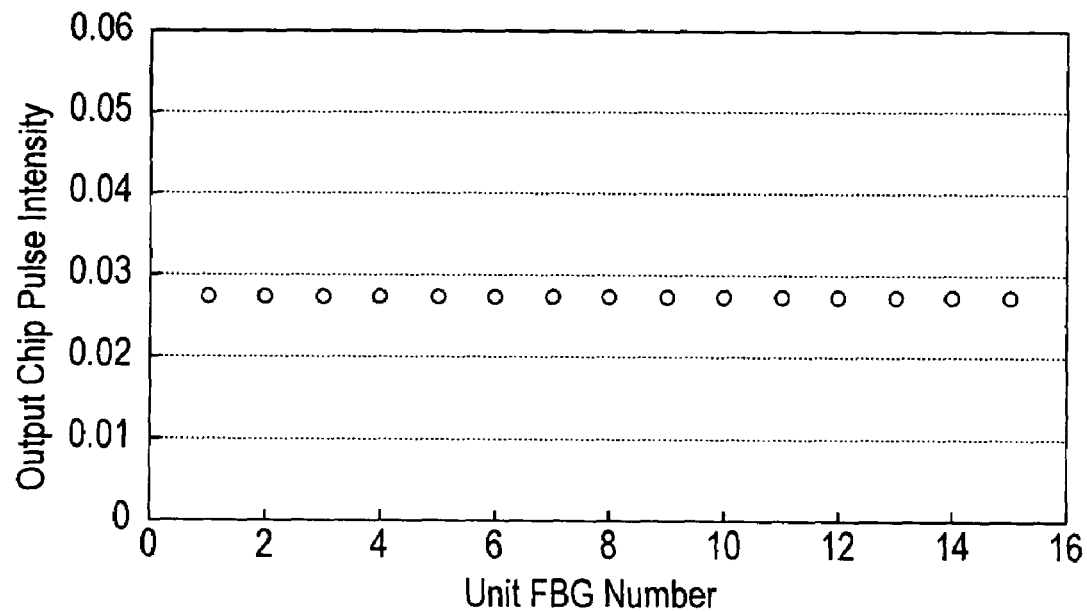
Figure 4A:
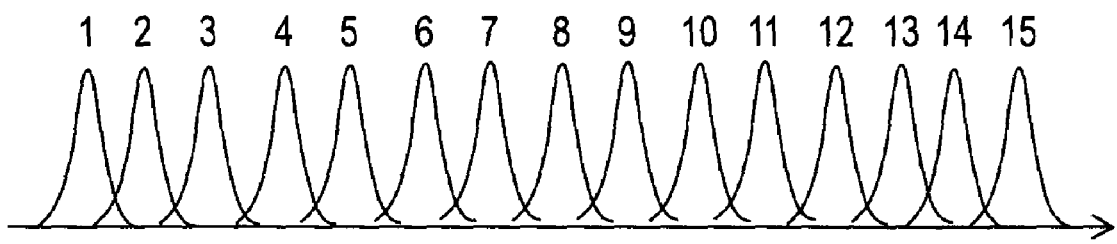
FIG. 4 are diagrams depicting the time-based waveforms of the chip pulse string to be output from the optical pulse time spreader.
Figure 4B:
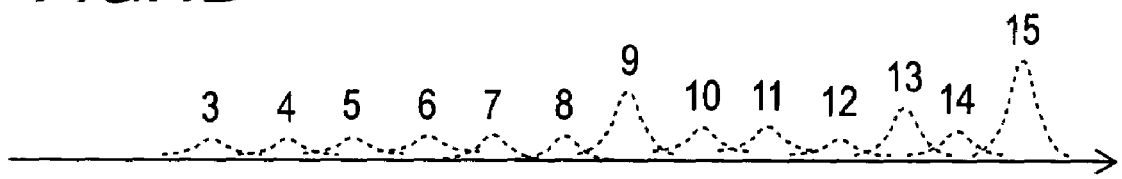
Figure 4C:
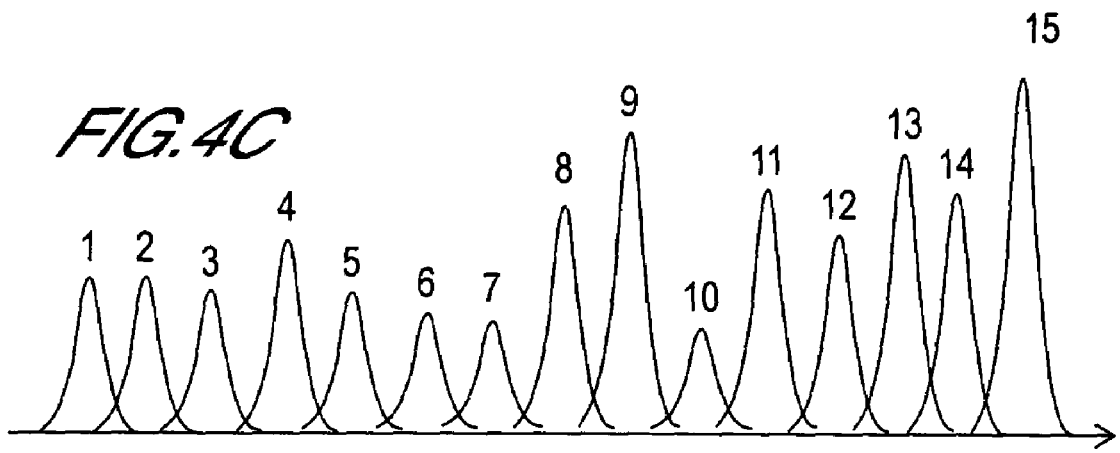
Figure 5A:
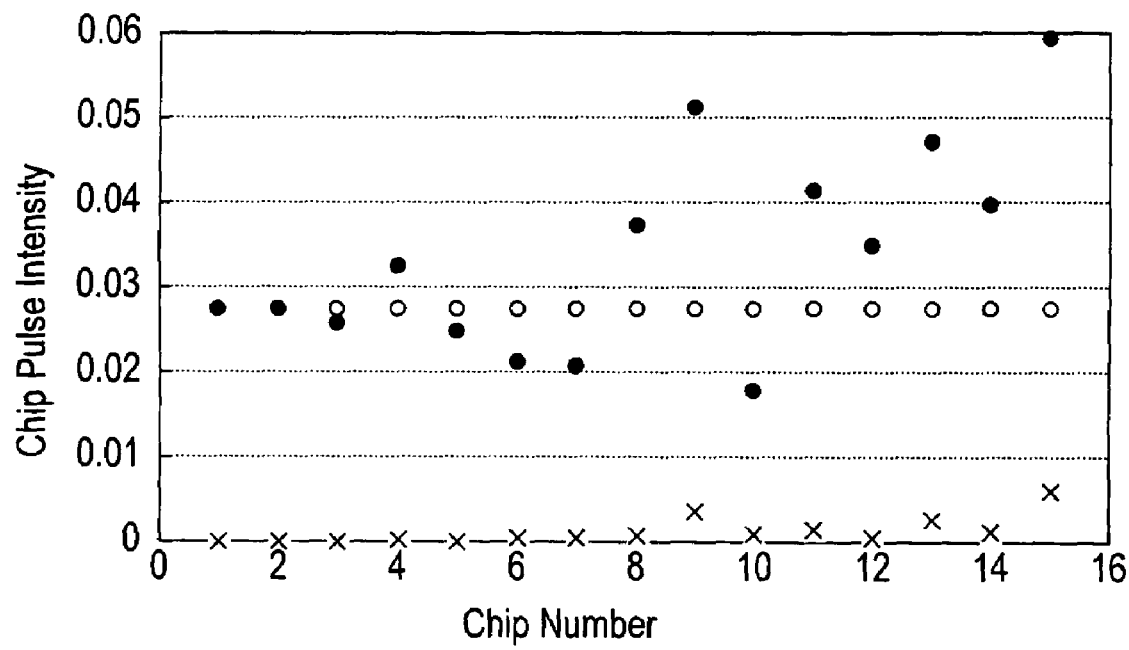
FIG. 5 are graphs depicting the simulation result of the time-based waveform of the chip pulse string to be output from the optical pulse time spreader.
Figure 5B:
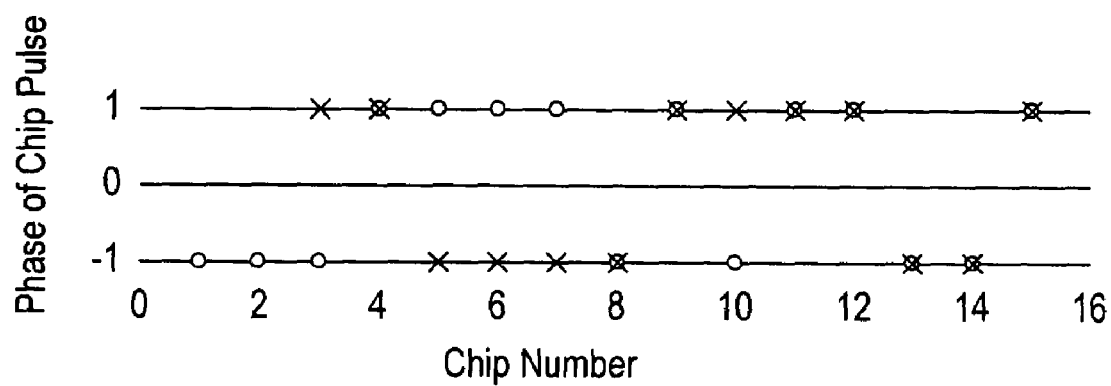
Figure 8B:
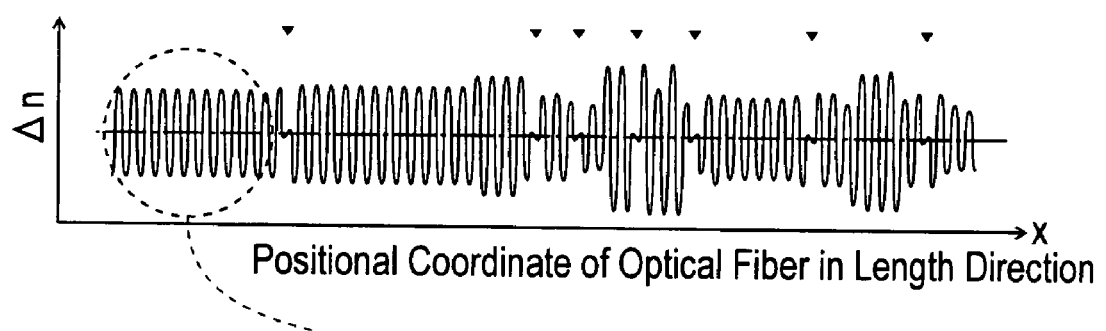

FIG. 8B is a diagram depicting the refractive index modulation structure of the SSFBG 40 shown in FIG. 8A. The abscissa of FIG. 8B indicates the positional coordinate of the optical fiber in the length direction, and the ordinate indicates the level $\Delta n$ of the refractive index modulation, with the effective refractive index $n_{eff}$ of the optical fiber at the center. For other aspects, FIGS. 8A to 8C are shown in the same manner as FIGS. 2A to 2C.

Figure 8C:
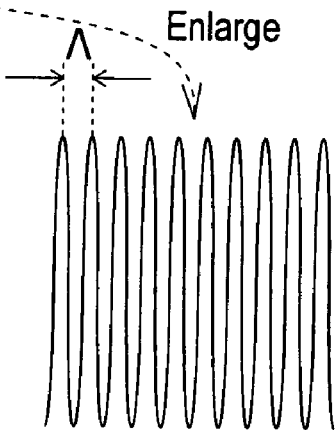

FIG. 8C is an enlarged view of a part of the refractive index modulation structure of the unit FBG shown in FIG. 8B. The code being set for the SSFBG 40 is (0, 0, 0, 1, 1, 1, 1, 0, 1, 0, 1, 1, 0, 0, 1). As the black dots in FIG. 7A show, the reflectance of each unit FBG to be installed in the SSFBG 40 does not simply increase sequentially from the input end, so the level $\Delta n$ of the refractive index modulation also changes in a complicated way along the positional coordinate of the optical fiber in the length direction, as shown in the unit FBG in FIG. 8B.

Figure 9:
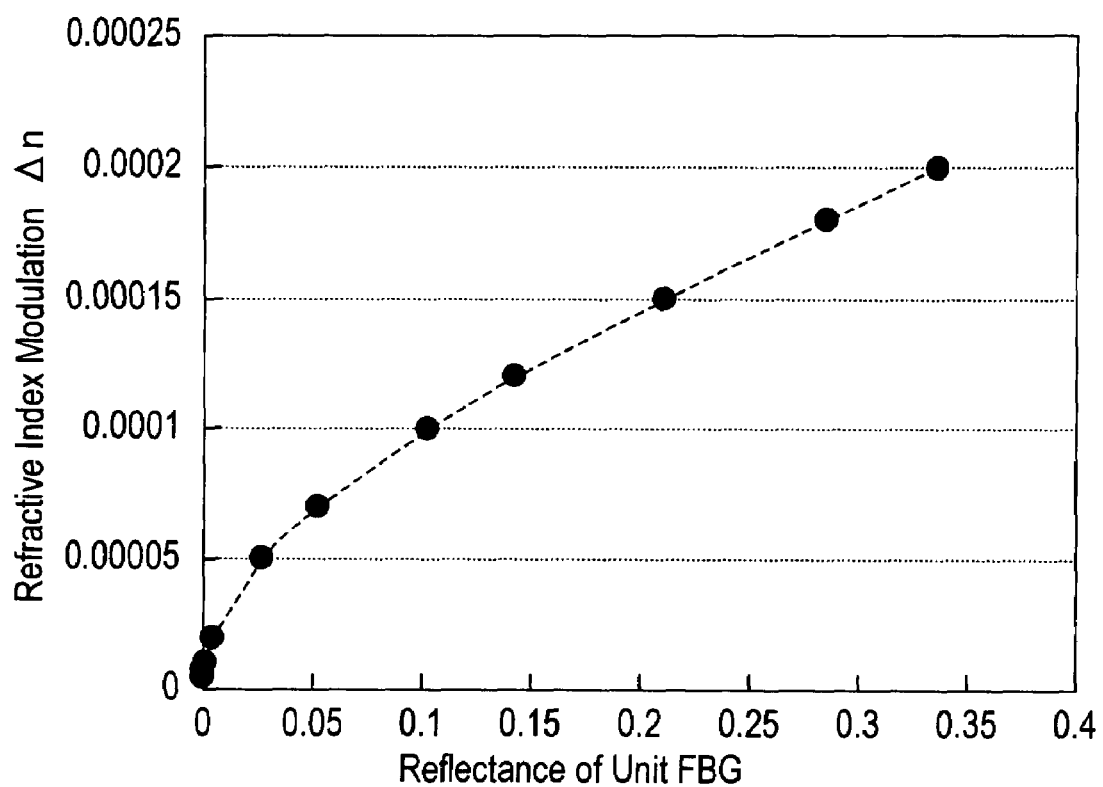
FIG. 9 is a graph depicting the relationship between the reflectance of the unit FBG of the first embodiment and level $\Delta n$ of the refractive index modulation.

The relationship between the reflectance of the unit FBG to be installed in the SSFBG of the first embodiment and the level $\Delta n$ of the refractive index modulation will be described with reference to FIG. 9. FIG. 9 is a graph depicting the relationship between the reflectance of the unit FBG of the first embodiment and the level $\Delta n$ of the refractive index modulation of the unit FBG, where the abscissa indicates the reflectance, and the ordinate indicates the level $\Delta n$ of the refractive index modulation. Here it is assumed that the length of the unit FBG is 2.4 mm, the average of the effective refractive index of the optical fiber is 1.4473, and the refractive index modulation period $\Lambda$ of the unit FBG is 535.5 nm. Therefore the wavelength $\lambda$ of the Bragg-reflected light given by $2n_{eff} \times \Lambda$ is 1550 nm.

Using the relationship between the reflectance of the unit FBG and the level $\Delta n$ of the refractive index modulation of the unit FBG, shown in FIG. 9, $\Delta n$ corresponding to the reflectance $R_k$ (k is an integer in the 1 to 15 range) of each unit FBG determined using Formula (a), Formula (b), Formula (c-1) and Formula (c-2) of the present invention can be known. Therefore $\Delta n$ is determined for each unit FBG, so the SSFBG can be formed by sequentially corresponding FBG 1 to FBG 15 accordingly.

Figure 10A:
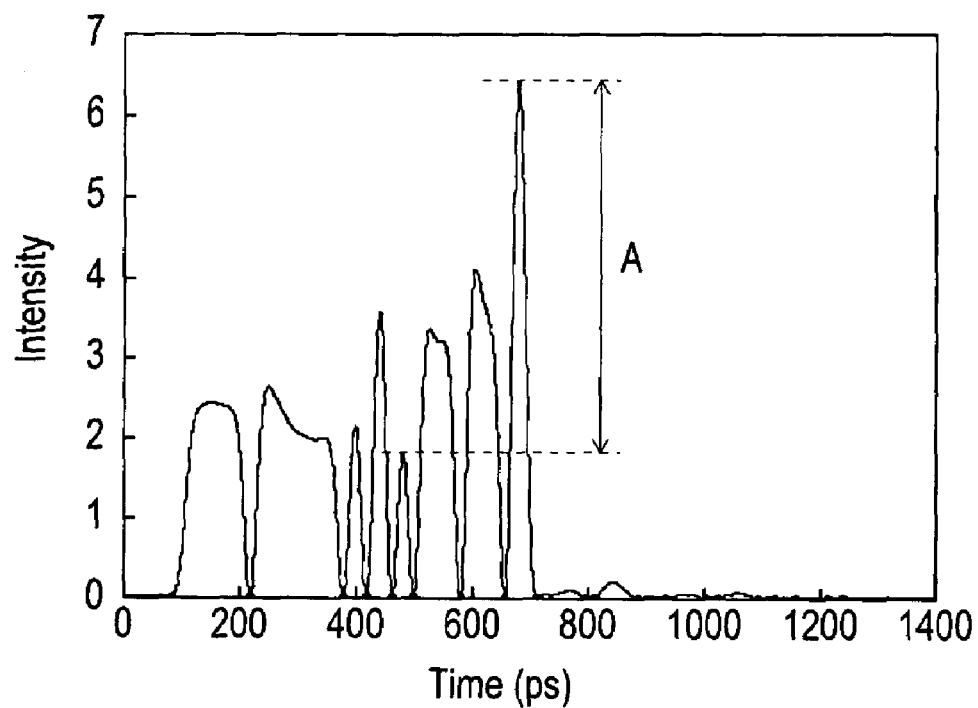
FIG. 10 are graphs depicting the time-based waveforms of the chip pulse strings to be output from the optical pulse time spreaders of the prior art and first embodiment.
Figure 10B:
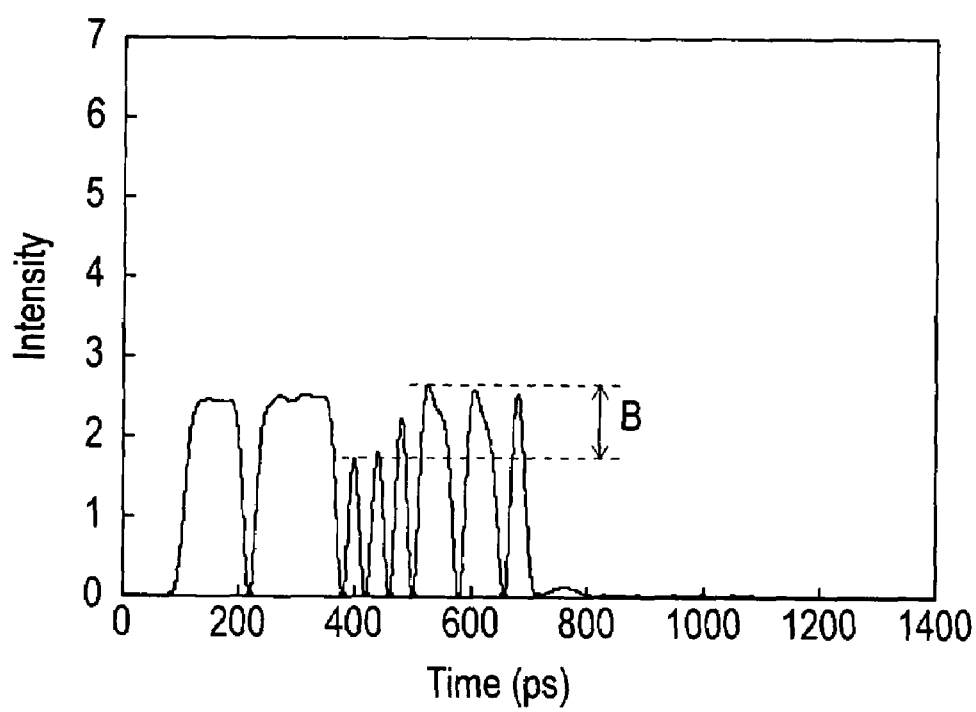

The encoding characteristic of the SSFBG of the first embodiment will be described with reference to FIGS. 10A and 10B. FIG. 10A shows a time-based waveform of the chip pulse when a single optical pulse is encoded and output by the SSFBG of prior art. FIG. 10B shows the time-based waveform of the chip pulse when a single optical pulse is encoded and output by the SSFBG of the first embodiment. The abscissa of FIGS. 10A and 10B is a time base scaled in ps (pico second) units. The ordinate indicates the intensity of the optical signal scaled in an arbitrary scale.

The difference A between the maximum and minimum of the intensities of chip pulses which are output from the SSFBG of the prior art shown in FIG. 10A is 5 times larger compared with the difference B between the maximum and minimum of the chip pulses which are output from the SSFBG of the first embodiment shown in FIG. 10B ($A/B \cong 5$). In other words, according to the SSFBG of the first embodiment, the intensities of the chip pulses to be output can be equalized.

The auto-correlation waveform which is formed by decoding an optical pulse encoded by the SSFBG of the first embodiment will be described with reference to FIG. 11A to 11C. Here the code being set in the encoder is (0, 0, 0, 1, 1, 1, 1, 0, 1, 0, 1, 1, 0, 0, 1), and the reflectance to be set for each unit FBG of the encoder is shown in FIG. 7A. The code being set for the decoder is (1, 0, 0, 1, 1, 0, 1, 0, 1, 1, 1, 1, 0, 0, 0,), of which sequence of numbers are from those being set for the encoder. The reflectance to be set for each unit FBG of the decoder is shown in FIG. 7B.

Figure 1A:
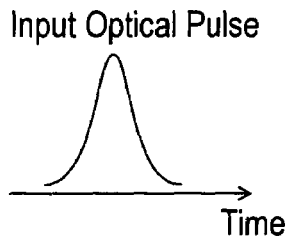
FIG. 1 are diagrams for explaining the operation principle of the encoder and decoder.
Figure 1B:
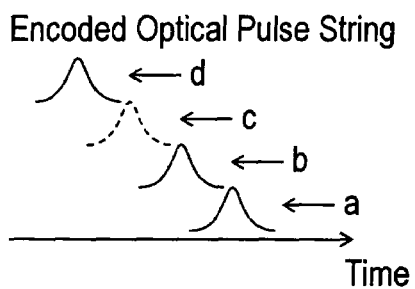
Figure 1C:
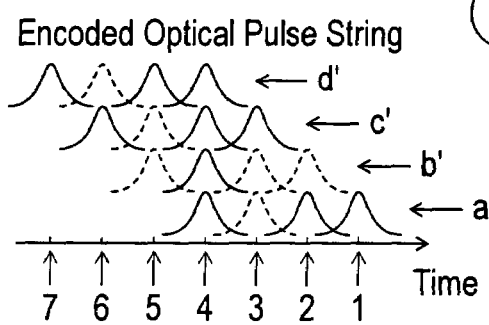
Figure 1D:
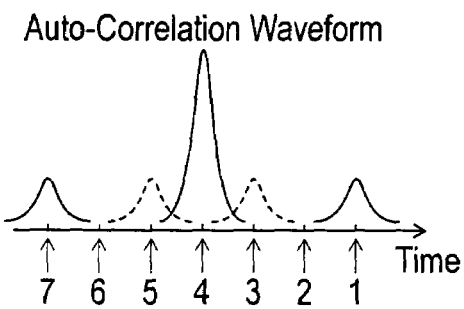
Figure 1E:
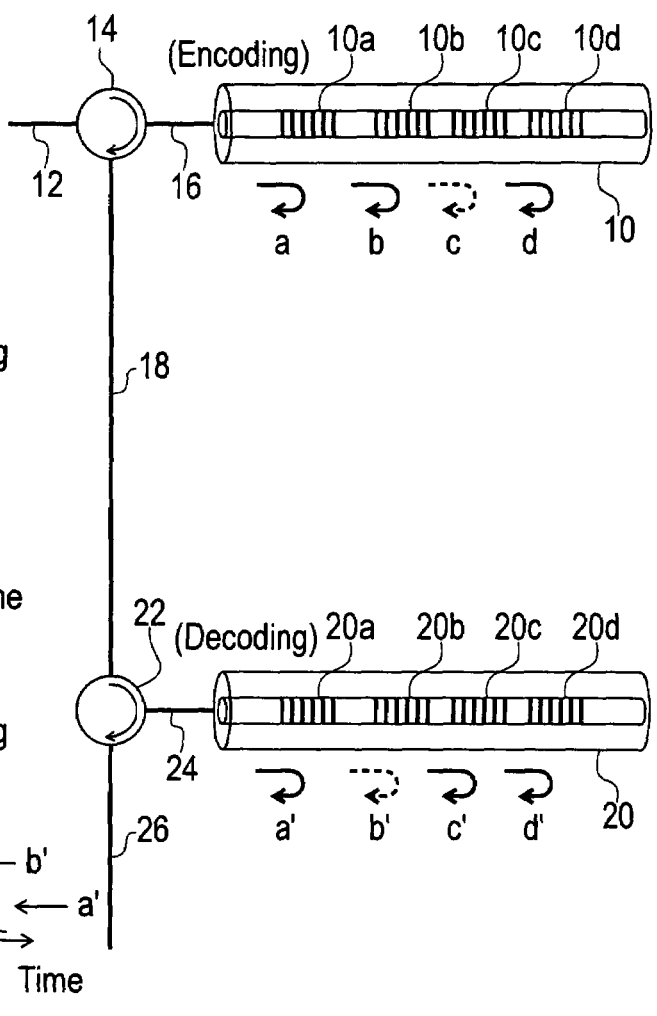
Figure 11A:
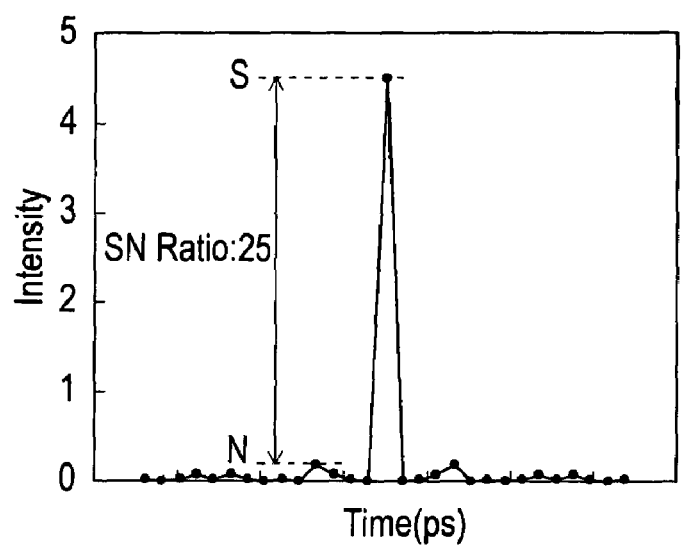
FIG. 11 are graphs depicting the auto-correlation waveforms to be generated and output by the optical pulse time spreader of the first embodiment.

In FIGS. 11A to 1C, the abscissa indicates a time base, and the ordinate indicates a signal intensity in an arbitrary scale. The abscissa in FIG. 11A is in an arbitrary scale, and the abscissa in FIGS. 11B and 11C is scaled in ps (pico second) units. FIG. 11A shows the result when the auto-correlation waveform ideally decoded is determined by calculation based on code theory. FIG. 11B shows the auto-correlation waveform when encoding and decoding are performed by the SSFBG of prior art, and FIG. 11C shows the auto-correlation waveform when encoding and decoding are performed by the SSFBG of the first embodiment.

It is desirable that the auto-correlation waveform is generated such that the side peak is as small as possible. In other words, a decoder is for regenerating the optical pulse before encoding, so an ideal is regenerating a single optical pulse. This means that the ratio of the peak and sub-peak of the auto-correlation waveform, which is a signal to noise ratio (S/N ratio), is larger the better.

As FIG. 11A shows, the ratio of the peak and sub-peak of the auto-correlation waveform is 25 in the case of ideal decoding, and this value is the theoretical limit value. In the case of the auto-correlation waveform when encoding and decoding are performed by the SSFBG of the prior art, the ratio of the peak and sub-peak of the auto-correlation waveform is 18.2, as shown in FIG. 11B. In the case of the auto-correlation waveform when encoding and decoding are performed by the SSFBG of the first embodiment, the ratio of the peak and sub-peak of the auto-correlation waveform is 21.5, as shown in FIG. 11B. In other words, according to the SSFBG of the first embodiment, an auto-correlation waveform of which S/N ratio is large can be generated. Therefore by using the SSFBG optical pulse time spreader of the first embodiment for an encoder and decoder of OCDM, a system which can insure higher reliability can be constructed, compared with the case of using a conventional SSFBG optical pulse time spreader.

SECOND EMBODIMENT

Figure 12A:
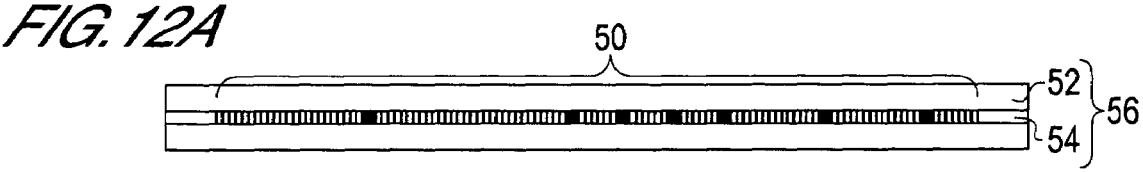
FIG. 12 are diagrams depicting the general structure of the phase control means of the optical pulse time spreader of the second embodiment.
Figure 12B:
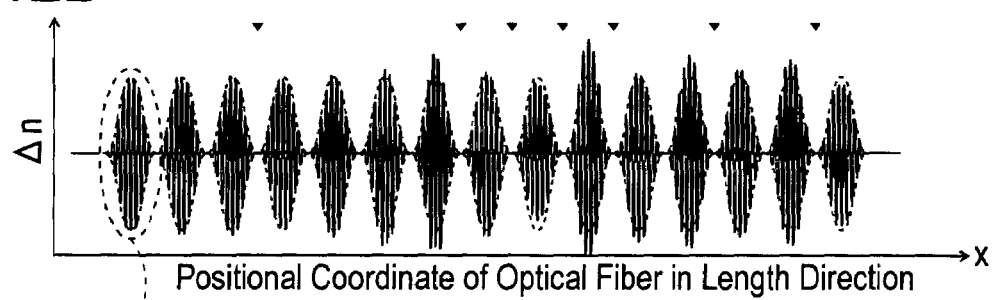

The structure of the SSFBG 50 as a phase control means of an optical pulse time spreader of the second embodiment will be described with reference to FIGS. 12A to 12C. FIG. 12A is a cross-sectional view of the SSFBG 50, where 15 unit FBGs are arrayed in series in a core 54 of an optical fiber 56 comprising the core 54 and clad 52, along the wave guiding direction of the core 54, which is an optical wave guide of the optical fiber 56. The only difference between SSFBG 50 and SSFBG 40 of the first embodiment is the refractive index modulation structure, and other portions are the same, so redundant explanation will be omitted. The optical phase code which is set for the SSFBG 50 of the second embodiment is also the same as the optical phase code being set for the SSFBG 40 of the first embodiment. For other aspects, FIGS. 12A to 12C are shown in the same manner as FIGS. 2A to 2C.

The difference between the refractive index modulation structure of the SSFBG 50 and the refractive index modulation structure of the SSFBG 40 of the first embodiment is that the refractive index modulation intensity of the periodic refractive index modulation structure of the unit FBG constituting the SSFBG 50 is apodized by a window function. In the second embodiment, a Gaussian error function is used for this window function.

A method of apodizing the refractive index modulation intensity of the periodic refractive index modulation structure of the unit FBG using the window function will now be described with reference to FIG. 12C.

Figure 12C:
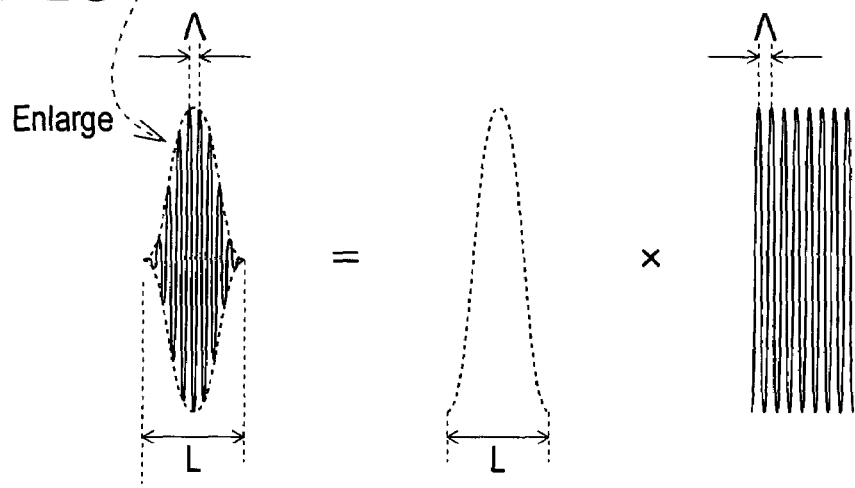

As the extreme right side in FIG. 12C shows, the periodic refractive index modulation structure of the unit FBG before apodizing is given by amplitude $\Delta n/2$, and is constant along the wave guiding direction (x direction) of the optical fiber. In other words, the periodic refractive index modulation structure of the unit FBG before apodization is given by the following Formula (3).

$$(\Delta n/2) \cdot \sin(2\pi x/\Lambda) \quad (3)$$

Here x is a positional coordinate of the optical fiber in the length direction.

A unit FBG having a periodic refractive index modulation structure given by a new function which is Formula (3) multiplied by a window function given by the following Formula (4) is referred to as a unit FBG apodized by the function given by Formula (4).

$$\exp[-1n2[2(x-(L-2))/LB]^2] \quad (4)$$

Here 1n2 indicates a natural logarithm of 2. exp indicates an exponential function of which exponent is the base of the natural logarithm. Here, just like the first embodiment, it is assumed that the length L of the unit FBG is 2.4 mm, the average of the effective refractive index of the optical fiber is 1.4473, and the refractive index modulation period $\Lambda$ of the unit FBG is 535.5 nm. Therefore the wavelength $\lambda$ of the Bragg-reflected light given by $\lambda = 2n_{eff} \times \Lambda$ is 1550 nm. B is a coefficient for band adjustment, and it is set to B=0.5 here.

By apodization, a concentrated Bragg reflection occurs at the center of each FBG, and as a result, the half width of the time-based waveform of the generated Bragg-reflected light becomes small. In other words, the half width of the chip pulse constituting the encoded optical pulse string becomes small, so overlapping of the bottom areas of chip pulses constituting the encoded optical pulse string on the time base can be decreased. If overlapping of the bottom areas of chip pulses can be decreased, the effect of interference due to overlapping of the bottom areas of chip pulses on the time base can be decreased. As a result, the intensity difference of chip pulses can be decreased compared with the case of encoding and decoding using the optical pulse time spreader of the first embodiment.

The function for the apodization corresponding to Formula (4) is not limited to a Gaussian error function. Any function that can apodize the level of amplitude of the periodic refractive index modulation structure of the unit FBG given by Formula (3), so as to be maximum at the center area of the unit FBG, can be used. For example, a function used for the signal processing technology field, such as Raised cosine, Tan h, Blackman, Hamming, Hanning, etc., can be used.

Now a method for determining the level $\Delta n$ of the refractive index modulation of each unit FBG will be described. For this, the reflectance to be set for each unit FBG must be determined. The method for determining this reflectance was explained in the first embodiment, and is therefore omitted here. In the second embodiment as well, the code being set for the SSFBG 50 is the same code as the code being set for the SSFBG 40 of the first embodiment. Therefore the reflectance to be set for each unit FBG is the same as the case of the first embodiment.

Figure 13:
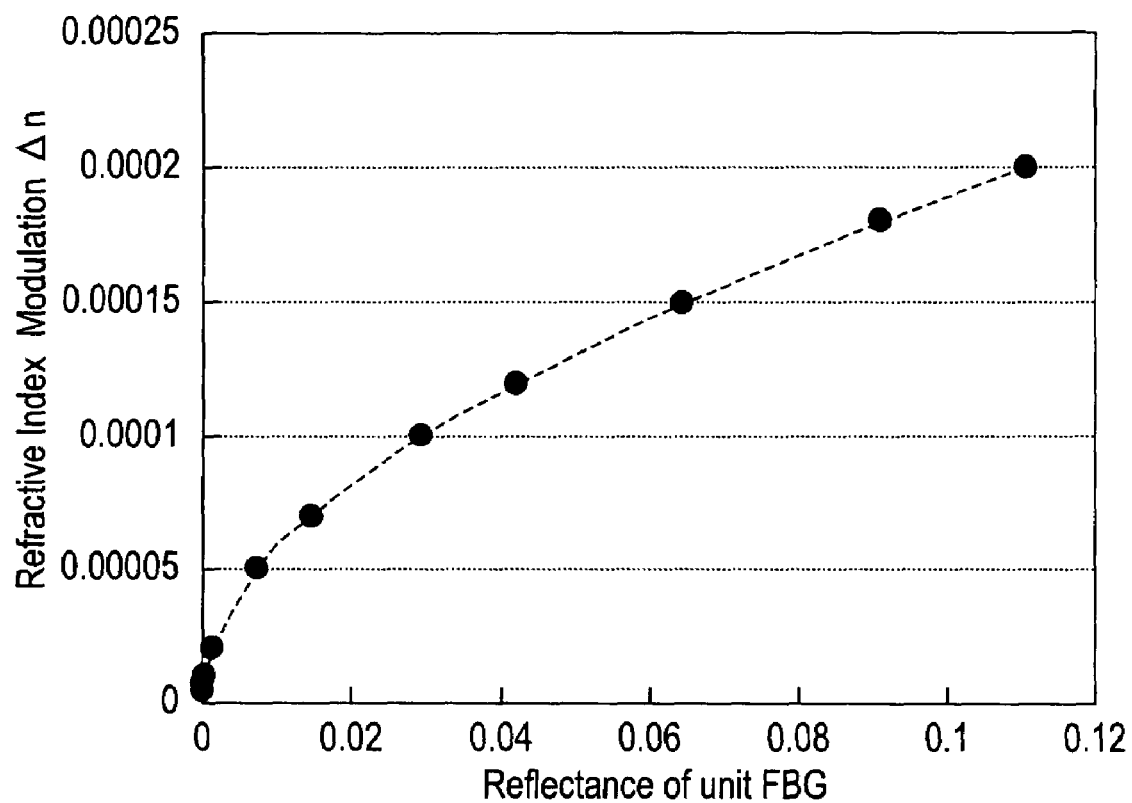
FIG. 13 is a graph depicting the relationship between the reflectance of the unit FBG of the second embodiment and level $\Delta n$ of the refractive index modulation.

So the relationship between the reflectance to be set for each FBG and the level $\Delta n$ of the refractive index modulation in the case of the second embodiment must be determined. This relationship is shown in FIG. 13 in the same way as FIG. 9. FIG. 13 is a graph depicting the relationship between the reflectance of the level $\Delta n$ of the refractive index modulation of the unit FBG of which length L apodized by the Gaussian error function provided by the above Formula (4) is 2.4 mm. The abscissa of FIG. 13 indicates the reflectance of the unit FBG, and the ordinate indicates the level $\Delta n$ of the refractive index modulation. Using the relationship shown in FIG. 13, the level $\Delta n$ of the refractive index to be set for each unit FBG is determined, and the SSFBG 50 of the second embodiment can be formed.

Figure 14A:
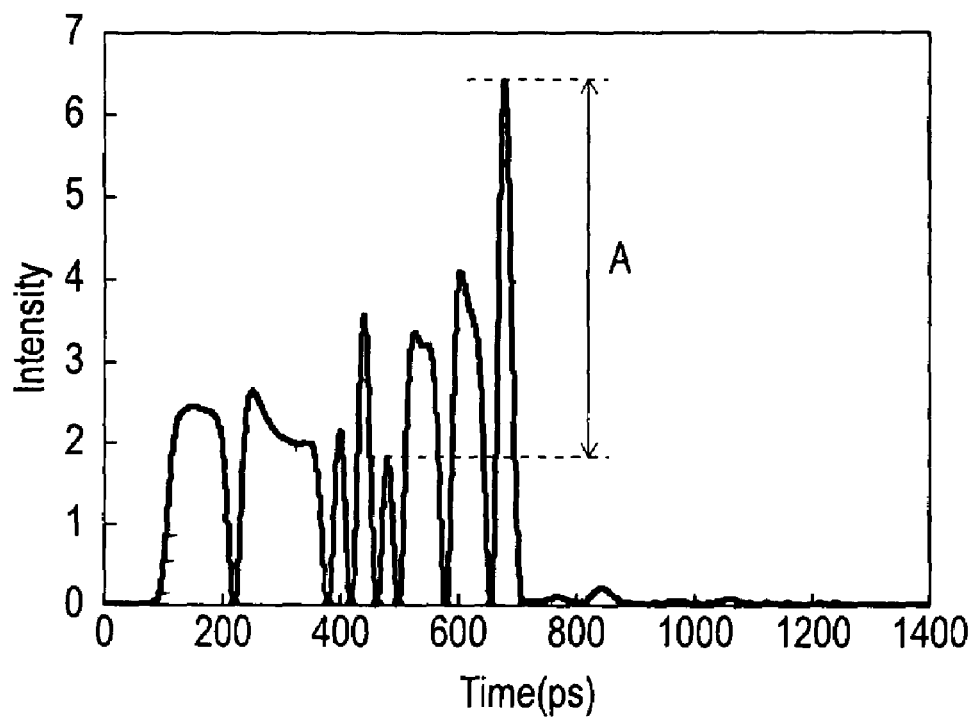
FIG. 14 are graphs depicting the time-based waveforms of the chip pulse strings to be output from the optical pulse time spreaders of the prior art and second embodiment.
Figure 14B:
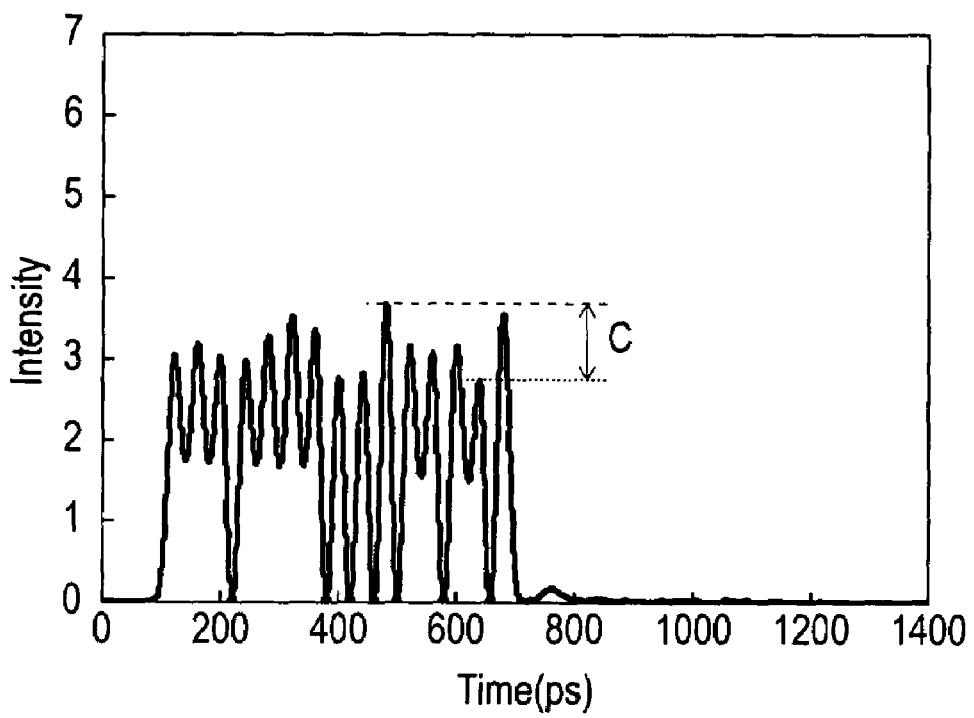

The encoding characteristic of the SSFBG of the second embodiment will be described with reference to FIGS. 14A and 14B. The code being set in the SSFBG of the second embodiment is the same as the first embodiment, which is (0, 0, 0, 1, 1, 1, 1, 0, 1, 0, 1, 1, 0, 0, 1). FIG. 14A shows a time-based waveform of the chip pulse when a single optical pulse is encoded and output by the SSFBG of the prior art. FIG. 14B shows the time-based waveform of the chip pulse when a single optical pulse is encoded and output by the SSFBG of the second embodiment. The abscissa of FIGS. 14A and 14B is a time base scaled in ps (pico second) units. The ordinate indicates the intensity of the optical signal scaled in an arbitrary scale.

The difference A between the maximum and minimum of the intensities of chip pulses which are output from the SSFBG of the prior art shown in FIG. 14A is 5 times larger compared with the difference C between the maximum and minimum of the chip pulses which are output from the SSFBG of the second embodiment shown in FIG. 14B. In other words, according to the optical pulse time spreader of the second embodiment, the intensities of the chip pulses to be output can be equalized.

Also as mentioned above, according to the SSFBG of the second embodiment, the overlapping of the bottom areas of chip pulses constituting the encoded optical pulse string on the time base decreases. In other words, interference between adjacent chip pulses decreases, and each chip pulse is clearly separated. This means that the input optical pulse is evenly spread within the spreading time on the time base. In this way, the input optical pulse being spread evenly within the spreading time on the time base has the following advantages.

An auto-correlation waveform which is formed by decoding an optical pulse encoded by the SSFBG of the second embodiment will be described with reference to FIGS. 15A to 15C. Here the code being set in the encoder is (0, 0, 0, 1, 1, 1, 1, 0, 1, 0, 1, 1, 0, 0, 1), and the reflectance to be set for each unit FBG of the encoder is shown in FIG. 7A. The code being set for the decoder is (1, 0, 0, 1, 1, 0, 1, 0, 1, 1, 1, 1, 0, 0, 0), which is the reversed sequence of numbers of the code being set for the encoder. The reflectance to be set for each unit FBG of the decoder is shown in FIG. 7B.

It is desirable that the auto-correlation waveform is generated such that the side peak is as small as possible. In other words, a decoder is for regenerating the optical pulse before encoding, so the ideal is regenerating a single optical pulse.

Figure 11B:
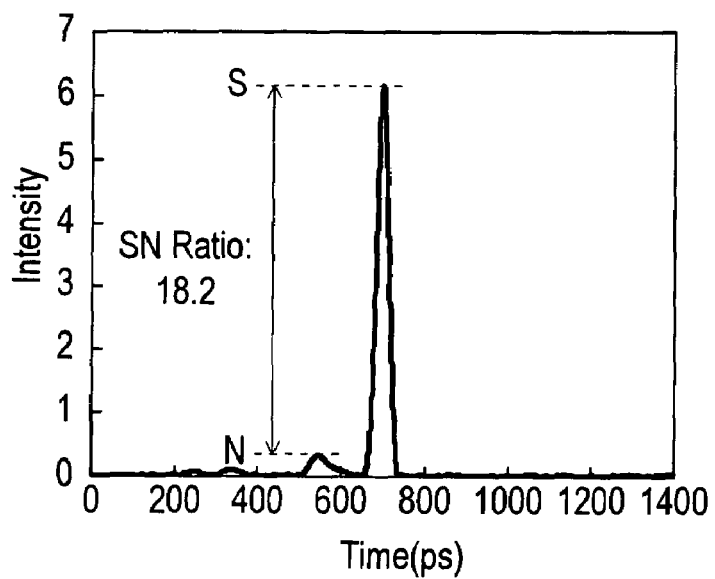
Figure 11C:
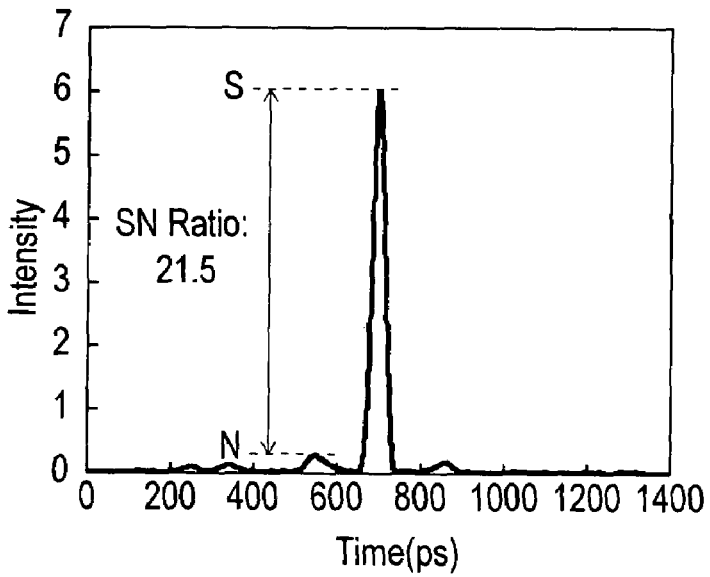
Figure 15A:
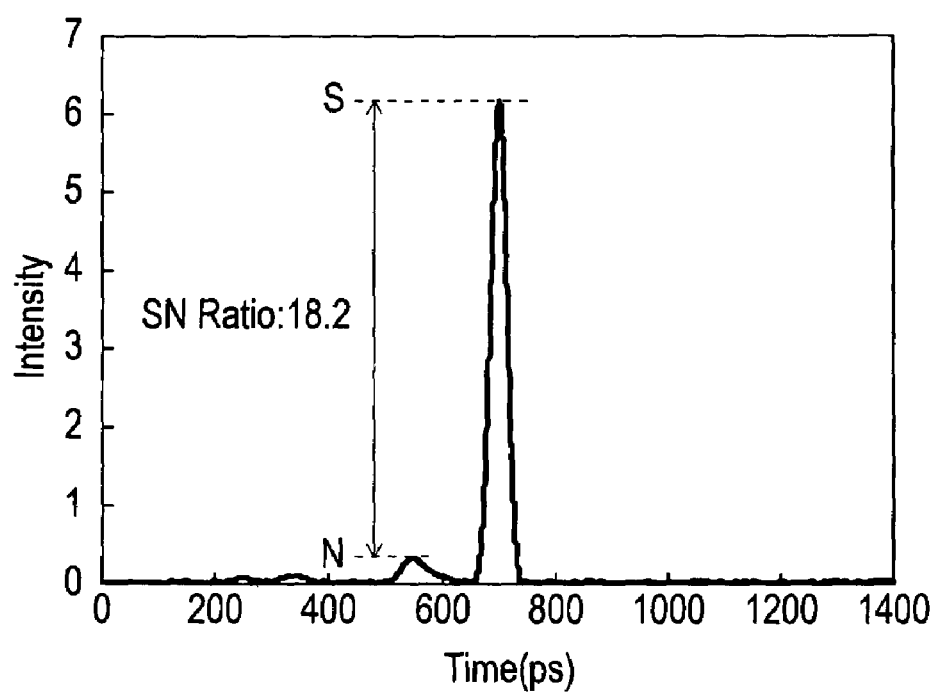
FIG. 15 are graphs depicting the auto-correlation waveforms generated and output by the optical pulse time spreader of the second embodiment.

FIG. 15A shows an auto-correlation waveform which is generated and output by the SSFBG of the prior art, which is the same graph as the above mentioned FIG. 11B. FIG. 15B shows an auto-correlation waveform which is generated and output by the SSFBG of the second embodiment. The abscissa of FIGS. 15A and 15B is a time base scaled in ps (pico second) units. The ordinate indicates the intensity of an optical signal scaled in an arbitrary scale.

Figure 15B:
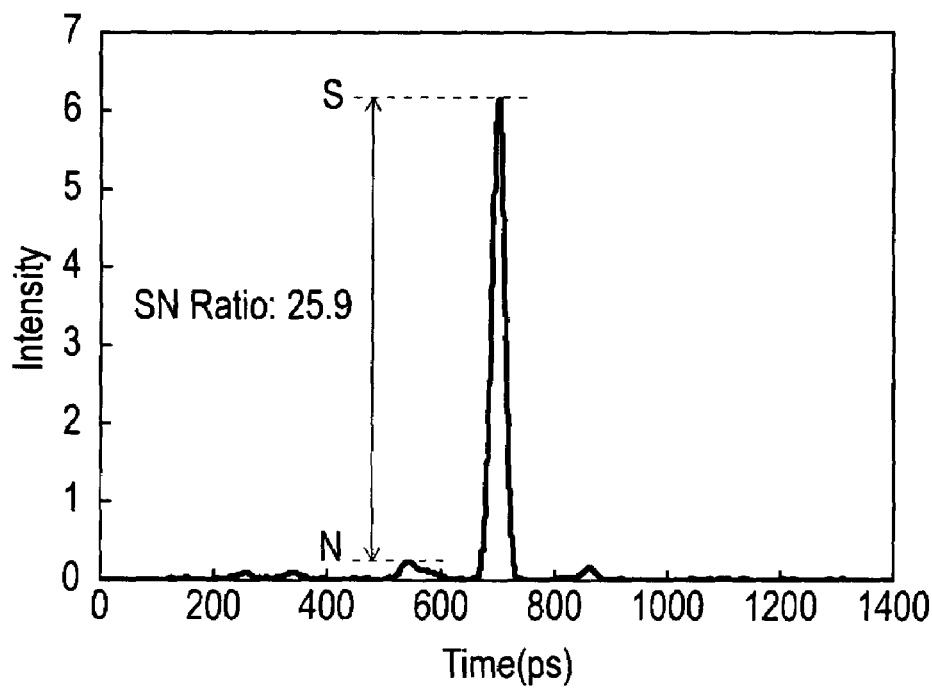

While the ratio of the peak and sub-peak of the auto-correlation waveform which is generated and output by the SSFBG of the prior art shown in FIG. 15A is 18.2, the ratio of the peak and sub-peak of the auto-correlation waveform which is generated and output by the SSFBG of the second embodiment shown in FIG. 15B is 25.9. This value is larger than the ratio of the peak and sub-peak of the auto-correlation waveform which is generated and output by the SSFBG of the first embodiment, that is 21.5.

As FIG. 11A shows, the ratio of the peak and sub-peak of the auto-correlation waveform is 25 in the case of an ideal decoding, which is large compared with the ideal value when apodization is not performed. The ratio of the peak and sub-peak of the auto-correlation waveform shown in FIG. 11A is calculated based on the assumption that apodization is not performed for each unit FBG, and the ratio of the peak and sub-peak of the auto-correlation waveform which is generated and output by the SSFBG of the second embodiment shown in FIG. 15B is large, 25.9, which means that the effect of apodization is high.

The ratio of the peak and sub-peak of the auto-correlation waveform is the signal-to-noise ratio (S/N ratio), so the greater this ratio the better. In other words, according to the SSFBG of the second embodiment, the auto-correlation waveform of which S/N ratio is larger, not only compared to a conventional SSFBG but also to the ideal value of the SSFBG of the first embodiment, can be generated. Therefore by using the optical pulse time spreader of the second embodiment as an encoder and decoder of OCDM, an optical communication system which can insure an even higher reliability can be constructed.

What is claimed is:

1. An optical pulse time spreader comprising phase control means for time-spreading an optical pulse to be a string of chip pulses sequentially arrayed on a time base by encoding using an optical phase code and generating and outputting said chip pulse string, wherein said phase control means comprises unit diffraction gratings, which correspond to code values constituting said optical phase code one-to-one, arrayed in a row from a first to J-th unit diffraction grating (J is 3 or higher integer) sequentially from an input end of an optical wave guide along a wave guiding direction of said optical wave guide, chip pulses sequentially output from said phase control means are first to J-th chip pulses, said first chip pulse is a chip pulse which is generated and output by a single Bragg reflection at said first unit diffraction grating, said second chip pulse is a chip pulse which is generated and output by a single Bragg reflection at said second unit diffraction grating, a k-th chip pulse, where k is an integer that satisfies $3 \leq k \leq J$, is a chip pulse generated as a result of interference between a single reflection chip pulse which is generated and output by a single Bragg reflection at the k-th unit diffraction grating and an odd count reflection chip pulse which is generated and output by a triple or higher odd count of Bragg reflection based on a plurality of said unit diffraction gratings, reflectance of each of said unit diffraction gratings is set so that all the intensities of said first to J-th chip pulses are equalized, wherein reflectance $R_1$ of said first unit diffraction grating is given by $$R_1 = P_c \text{(constant)} \tag{a},$$

reflectance $R_2$ of said second unit diffraction grating is given by $$R_2 = P_c/(1-R_1)^2 \tag{b}$$

and reflectance $R_k$ of said K-th unit diffraction grating is given by $$R_k = (P_c^{1/2} - P_k^{1/2})^2 / \{(1-R_1)^2 (1-R_2)^2 \ldots (1-R_{k-1})^2\} \tag{c-1}$$

$$R_k = (P_c^{1/2} + P_k^{1/2})^2 / \{(1-R_1)^2 (1-R_2)^2 \ldots (1-R_{k-1})^2\} \tag{c-2}$$

and where $P_C$ is an arbitrary constant which is set as an intensity of said first chip pulse which is reflected from said first unit diffraction grating and is output from said phase control means; and $P_k$ is an intensity of a triple reflection chip pulse, which is output for the k-th time from said phase control means; said formula (c-1) expresses the reflectance of said k-th unit diffraction grating when the phase difference between said single reflection chip pulse which is generated from said k-th unit diffraction grating by a single Bragg reflection and is output for the k-th time, and said triple reflection chip pulse which is generated from said unit diffraction grating by a triple Bragg reflection and is output for the k-th time is $2P\pi$ (P is an integer), and said formula (c-2) expresses the reflectance of said k-th unit diffraction grating when the phase difference between said single reflection chip pulse which is generated from said k-th unit diffraction grating by a single Bragg reflection and is output for the k-th time, and said triple reflection chip pulse which is generated from said unit diffraction grating by a triple Bragg reflection and is output for the k-th time is $(2Q+1)\pi$ (Q is an integer).

2. An optical pulse time spreader comprising phase control means for time-spreading an optical pulse to be a string of chip pulses sequentially arrayed on a time base by encoding using an optical phase code and generating and outputting said chip pulse string, wherein said phase control means comprises unit diffraction gratings, which correspond to code values constituting said optical phase code one-to-one, arrayed in a row from a first to J-th unit diffraction grating (J is 3 or higher integer) sequentially from an input end of an optical wave guide along a wave guiding direction of said optical wave guide, a phase difference of Bragg reflected lights from two of said unit diffraction gratings which are laterally adjacent to each other and provide same code values is given by $$2M\pi \tag{1}$$

(M is an integer), a phase difference of Bragg reflected lights from two of said unit diffraction gratings which are laterally adjacent to each other and provide different code values is given by $$(2N+1)\pi \tag{2}$$

(N is an integer),
- chip pulses sequentially output from said phase control means are first to J-th chip pulses,
- said first chip pulse is a chip pulse which is generated and output by a single Bragg reflection at said first unit diffraction grating,
- said second chip pulse is a chip pulse which is generated and output by a single Bragg reflection at said second unit diffraction grating,
- a k-th chip pulse, where k is an integer that satisfies $3 \leq k \leq J$, is a chip pulse generated as a result of interference between a single reflection chip pulse which is generated and output by a single Bragg reflection at the k-th unit diffraction grating and an odd count chip pulse which is generated and output by a triple or higher odd count of Bragg reflection based on a plurality of said unit diffraction gratings,
- reflectance of each of said unit diffraction gratings is set so that all the intensities of said first to J-th chip pulses are equalized,
- wherein reflectance $R_1$ of said first unit diffraction grating is given by $$R_1 = P_c \text{(constant)} \quad \text{(a)},$$

reflectance R2 of said second unit diffraction grating is given by $$R_2 = P_c/(1-R_1)^2 \quad \text{(b), and}$$

reflectance Rk of said k-th unit diffraction grating is given by $$R_k = (P_c^{1/2} - P_k^{1/2})^2 / \{(1-R_1)^2 (1-R_2)^2 \ldots (1-R_{k-1})^2\} \quad \text{(c-1)}$$

$$R_k = (P_c^{1/2} + P_k^{1/2})^2 / \{(1-R_1)^2 (1-R_2)^2 \ldots (1-R_{k-1})^2\} \quad \text{(c-2) and,}$$

where PC is an arbitrary constant which is set as an intensity of said first chip pulse which is reflected from said first unit diffraction grating and is output from said phase control means; and $P_k$ is an intensity of said triple reflection chip pulse which is output for the k-th time from said phase control means; said formula (c-1) expresses the reflectance of said k-th unit diffraction grating when the phase difference between said single reflection chip pulse which is generated from said k-th unit diffraction grating by a single Bragg reflection and is output for the k-th time, and said triple reflection chip pulse which is generated from said unit diffraction grating by a triple Bragg reflection and is output for the k-th time is $2P\pi$ (P is an integer), and said formula (c-2) expresses the reflectance of said k-th unit diffraction grating when the phase difference between said single reflection chip pulse which is generated from said k-th unit diffraction grating by a single Bragg reflection and is output for the k-th time, and said triple reflection chip pulse which is generated from said unit diffraction grating by a triple Bragg reflection and is output for the k-th time is $(2Q+1)\pi$. (Q is an integer).

3. The optical pulse time spreader according to claim 1, wherein a refractive index modulation intensity of a periodic refractive index modulation structure of said unit diffraction grating is apodized by a window function.

4. The optical pulse time spreader according to claim 2, wherein a refractive index modulation intensity of a periodic refractive index modulation structure of said unit diffraction grating is apodized by a window function.

5. The optical pulse time spreader according to claim 3, wherein said window function is a Gaussian error function.

6. The optical pulse time spreader according to claim 4, wherein said window function is a Gaussian error function.

7. The optical pulse time spreader according to claim 1, wherein said optical wave guide is an optical fiber.

8. The optical pulse time spreader according to claim 2, wherein said optical wave guide is an optical fiber.

9. The optical pulse time spreader according to claim 3, wherein said optical wave guide is an optical fiber.

10. The optical pulse time spreader according to claim 4, wherein said optical wave guide is an optical fiber.

11. The optical pulse time spreader according to claim 5, wherein said optical wave guide is an optical fiber.

12. The optical pulse time spreader according to claim 6, wherein said optical wave guide is an optical fiber.

* * * * *